United States Patent
Han et al.

(10) Patent No.: US 11,182,968 B2
(45) Date of Patent: Nov. 23, 2021

(54) ELECTRONIC DEVICE AND CONTROL METHOD THEREOF

(71) Applicant: SAMSUNG ELECTRONICS CO., LTD., Suwon-si (KR)

(72) Inventors: Ji-youn Han, Seoul (KR); Min-sun Park, Seoul (KR); Sung-hyun Jang, Seoul (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 0 days.

(21) Appl. No.: 16/637,943

(22) PCT Filed: May 16, 2018

(86) PCT No.: PCT/KR2018/005638
§ 371 (c)(1),
(2) Date: Feb. 10, 2020

(87) PCT Pub. No.: WO2019/035536
PCT Pub. Date: Feb. 21, 2019

(65) Prior Publication Data
US 2020/0211289 A1 Jul. 2, 2020

(30) Foreign Application Priority Data
Aug. 16, 2017 (KR) .................. 10-2017-0103468

(51) Int. Cl.
*G06T 19/00* (2011.01)
*G06T 7/62* (2017.01)
(Continued)

(52) U.S. Cl.
CPC ........ *G06T 19/006* (2013.01); *G06F 3/04842* (2013.01); *G06F 3/04883* (2013.01);
(Continued)

(58) Field of Classification Search
None
See application file for complete search history.

(56) References Cited

U.S. PATENT DOCUMENTS 8,866,846 B2   10/2014  Kim
9,251,170 B2*   2/2016  Moore ............... G06F 16/583
(Continued)

FOREIGN PATENT DOCUMENTS

JP       2010-170316      8/2010
KR   10-2011-0138859     12/2011
(Continued)

OTHER PUBLICATIONS

Bimber et al., A multi-layered architecture for sketch-based interaction within virtual environments, Dec. 2000, 851-867 (Year: 2000).*

(Continued)

*Primary Examiner* — Robert J Craddock
(74) *Attorney, Agent, or Firm* — Nixon & Vanderhye, P.C.

(57) ABSTRACT

Disclosed are an electronic device and a control method capable of virtually arranging a product by synthesizing an image of a user's desired product with a spatial image. The control method of an electronic device, according to the present disclosure, comprises the steps of: capturing a marker object including a handwriting image to obtain an image; obtaining information on at least one product corresponding to the handwriting image; and if one of the at least one product is selected, synthesizing and displaying an image of the product on an area where the marker object image is located, on the basis of the information on the selected product, information on the size of the marker object, and information on the size of the marker object image.

13 Claims, 40 Drawing Sheets

(51) Int. Cl.
    *G06T 7/90*     (2017.01)
    *G06F 3/0484*   (2013.01)
    *G06F 3/0488*   (2013.01)
    *G06Q 30/06*    (2012.01)

(52) U.S. Cl.
    CPC ..... *G06Q 30/0625* (2013.01); *G06Q 30/0631* (2013.01); *G06T 7/62* (2017.01); *G06T 7/90* (2017.01)

(56) References Cited

U.S. PATENT DOCUMENTS

| | | | |
|---|---|---|---|
| 10,440,352 B2 | 10/2019 | Hayasaka et al. | |
| 10,503,350 B2 | 12/2019 | Kim et al. | |
| 2011/0237331 A1 | 9/2011 | Doucet et al. | |
| 2013/0222385 A1* | 8/2013 | Dorsey | G06T 19/00 345/427 |
| 2013/0223691 A1* | 8/2013 | Paczkowski | G06K 9/00671 382/106 |
| 2014/0063181 A1 | 3/2014 | Lee et al. | |
| 2014/0095348 A1* | 4/2014 | Goulart | G06Q 30/0633 705/26.8 |
| 2017/0109938 A1 | 4/2017 | Hilliges et al. | |

FOREIGN PATENT DOCUMENTS

| | | |
|---|---|---|
| KR | 10-2012-0124125 | 11/2012 |
| KR | 10-1334540 | 11/2013 |
| KR | 10-2014-0030668 | 3/2014 |
| KR | 10-1431804 | 8/2014 |
| KR | 10-1485738 | 1/2015 |
| KR | 10-2015-0065045 | 6/2015 |
| KR | 10-1576538 | 12/2015 |
| KR | 10-2016-0033495 | 3/2016 |
| KR | 10-1620938 | 5/2016 |
| KR | 10-2016-0106438 | 9/2016 |
| KR | 10-1679239 | 11/2016 |
| KR | 10-2016-0141458 | 12/2016 |
| WO | 2015/037472 | 3/2015 |

OTHER PUBLICATIONS

Bimber et al., A multi-layered architecture for sketch-based interaction within virtual environments, Dec. 2000, Computers & Graphics 24, 851-867 (Year: 2000).*
International Search Report for PCT/KR2018/005638 dated Aug. 31, 2018, 5 pages with English Translation.
Written Opinion of the ISA for PCT/KR2018/005638 dated Aug. 31, 2018, 11 pages with English Translation.
Office Action dated Jun. 30, 2021 in Korean Patent Application No. 10-2017-0103468 and English-language translation.

* cited by examiner

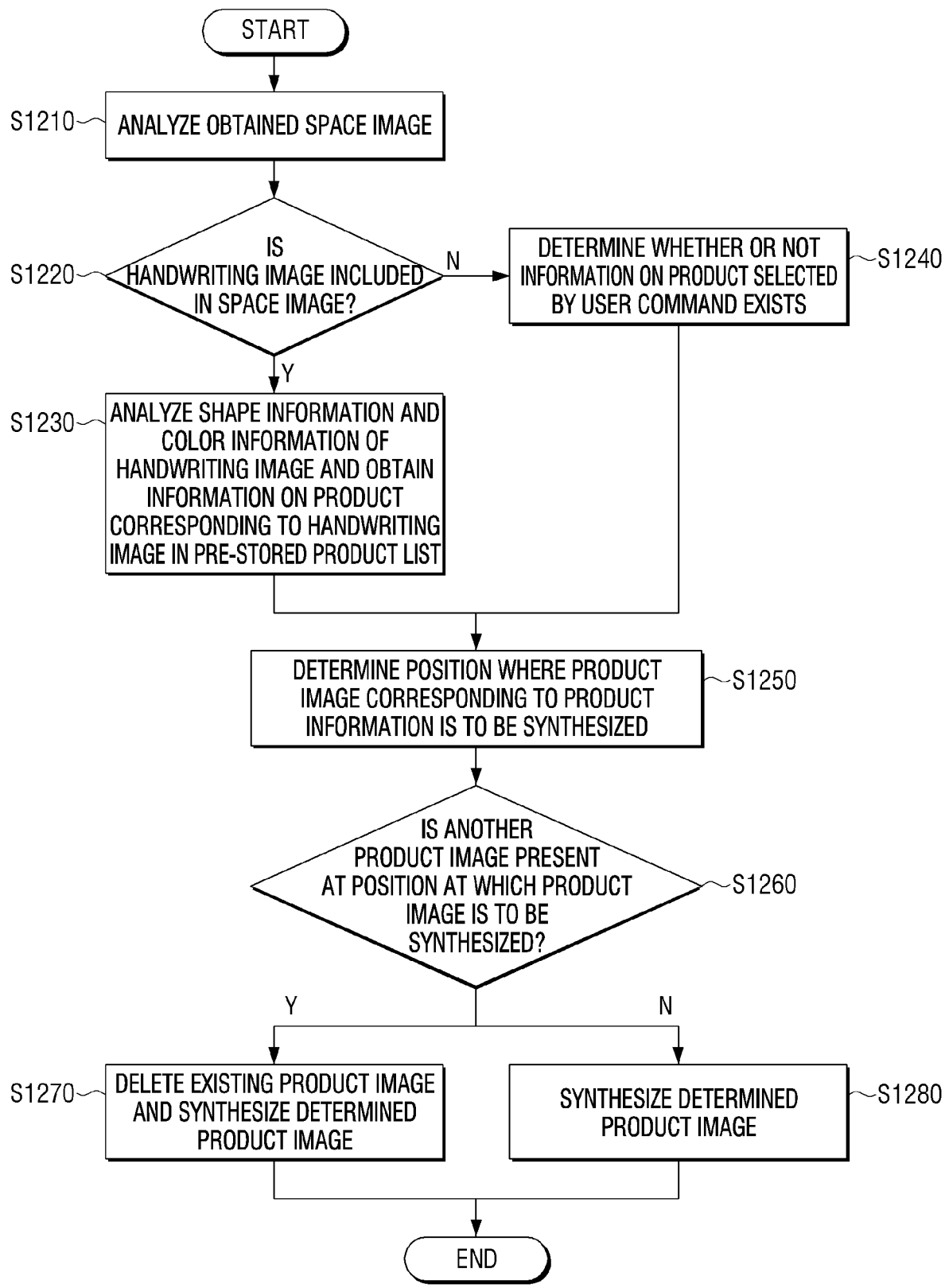

US 11,182,968 B2

ELECTRONIC DEVICE AND CONTROL METHOD THEREOF

This application is the U.S. national phase of International Application No. PCT/KR2018/005638 filed May 16, 2018 which designated the U.S. and claims priority to KR Patent Application No. 10-2017-0103468 filed Aug. 16, 2017, the entire contents of each of which are hereby incorporated by reference.

TECHNICAL FIELD

Apparatuses and methods consistent with the disclosure relate to an electronic device and a control method thereof, and more particularly, to an electronic device and a control method thereof capable of synthesizing an image of a product desired by a user with a space image to virtually arrange the product.

BACKGROUND ART

In a house, various furniture and electronic devices are arranged. Because furniture or electronic product generally has a large size and is expensive, a consumer determines whether or not to purchase the furniture or electronic product by considering various factors. Consumers value design as much as practicality when purchasing furniture and electronic product.

However, it is difficult for the consumer to determine whether or not the furniture or electronic product matches interior decoration of his/her house until the consumer purchases the furniture or electronic product and arranges the purchased furniture or electronic product in his/her house. Therefore, a method of virtually arranging furniture to assist in a purchase of the consumer has been discussed.

However, as a method of arranging virtual furniture according to the related art, a method of overlapping a furniture image with an image obtained by capturing an interior in which the consumer desires to arrange the furniture has been mainly used. In case of the method according to the related art, because the arranged virtual furniture does not match a size and perspective of an interior image, a state in which actual furniture is arranged is not accurately expressed in many cases. Further, even in case that the user may adjust the size and perspective, attributes of the virtual furniture, such as a size and perspective, need to be directly adjusted by the user, and thus it is difficult to accurately synthesize products.

Meanwhile, as the related art, a technology capable of recognizing a marker and arranging furniture corresponding to the marker exists. However, according to the related art, in case of arranging virtual furniture having a color or shape desired by the user in a manner in which a virtual furniture image is arranged by using a predetermined marker, a marker for furniture desired by the user needs to be exist, which is inconvenience.

SUMMARY

The disclosure provides an electronic device and a control method thereof capable of virtually arranging a desired product based on information on a size and a perspective of an image with a simple operation by a user, and a method thereof.

According to an embodiment of the disclosure, a control method of an electronic device includes: capturing a marker object including a handwriting image to obtain an image; obtaining information on one or more products corresponding to the handwriting image; and once one of the one or more products is selected, synthesizing and displaying an image of the product in and on a region in which the marker object image is positioned based on information on the selected product, size information of the marker object, and size information of the marker object image.

In the displaying, the image of the selected product may be processed by analyzing size information of the selected product, the size information of the marker object, the size information of the marker object image, and perspective information of the marker object image.

The handwriting image may include color information, and in the obtaining of the information on one or more products, information on one or more products corresponding to the handwriting image and the color information of the handwriting image may be obtained.

The control method may further include: once a user command to delete one of a plurality of product images included in the image is input, deleting the one product image; and performing image synthesis on a region from which the product image is deleted based on an image pattern of a surrounding region of the deleted product image and displaying a synthesized image.

The control method may further include: once a first product image is selected among a plurality of product images included in the image, obtaining first product information corresponding to the first product image; obtaining one or more other product information corresponding to the first product information; and once second product information is selected among the one or more other product information, deleting the first product image and synthesizing and displaying a second product image corresponding to the second product information in and on a region in which the deleted first product image is positioned.

The control method may further include: once one of a plurality of product images included in the image is selected, obtaining product information of the selected product image; and recommending new product information based on the obtained product information.

The control method may further include: obtaining color information of the image; and recommending new product information based on a plurality of product information included in the image and the color information.

In the displaying, once a user command specifying one of a plurality of product images included in the image is input, the one product image specified in the user command may be repositioned and displayed based on the user command.

The product information may be one of size information, category information, or price information of a product.

According to another embodiment of the disclosure, an electronic device includes: an image capturer configured to capture an image; a display configured to display the image; an inputter configured to receive a user command; at least one processor; and a memory configured to store one or more computer programs executed by the at least one processor, wherein the one or more computer programs include: a command to control the image capturer to capture a marker object including a handwriting image to obtain an image; a command to obtain information on one or more products corresponding to the handwriting image; a command to receive an input selecting one of the one or more products through the inputter; a command to synthesize and process an image of the selected product in a region in which the marker object image is positioned based on information on the selected product, size information of the marker object, and size information of the captured marker object image, in response to the input; and a command to control the display to control the synthesized image.

The command to process the image of the selected product may be a command to synthesize and process the image of the selected product by analyzing size information of the selected product, the size information of the marker object, the size information of the marker object image, and perspective information of the marker object image.

The handwriting image may include color information, and the command to obtain the information on one or more products may be a command to obtain information on one or more products corresponding to the handwriting image and the color information of the handwriting image.

The one or more computer programs may further include: a command to receive a user command to delete one of a plurality of product images included in the image, a command to delete the one product image; and a command to perform image synthesis and processing on a region from which the product image is deleted based on an image pattern of a surrounding region of the deleted product image.

The one or more computer programs may further include: a command to obtain first product information corresponding to a first product image once the first product image is selected among a plurality of product images included in the image; a command to obtain one or more other product information corresponding to the first product information; and a command to delete the first product image and synthesize and process a second product image corresponding to second product information in and on a region in which the deleted product image is positioned once the second product information is selected among the one or more other product information.

The one or more computer programs may further include: a command to obtain, once one of a plurality of product images included in the image is selected, product information of the selected product image; and a command to recommend new product information based on the obtained product information.

The one or more computer programs may further include: a command to obtain color information of the image; and a command to recommend new product information based on a plurality of product information included in the image and the color information.

The one or more computer programs may further include: a command to reposition and process, once a user command specifying one of a plurality of product images included in the image is input, the one product image specified in the user command based on the user command.

The product information may be one of size information, category information, or price information of a product.

According to another embodiment of the disclosure, a computer-readable recording medium including a program for controlling an electronic device is provided. A control method of an electronic device includes: capturing a marker object including a handwriting image to obtain an image; obtaining information on one or more products corresponding to the handwriting image; and once one of the one or more products is selected, synthesizing and displaying an image of the product in and on a region in which a marker object image is positioned based on information on the selected product, size information of the marker object, and size information of the marker object image.

As described above, according to various embodiments of the disclosure, it is possible to synthesize a product image having an accurate size with a space image, and recommend a product that matches the space image.

BRIEF DESCRIPTION OF THE DRAWINGS

FIG. 12 is a flowchart for describing a method for synthesizing a virtual product according to an embodiment of the disclosure.

DETAILED DESCRIPTION OF EXAMPLE EMBODIMENTS

Figure 1:
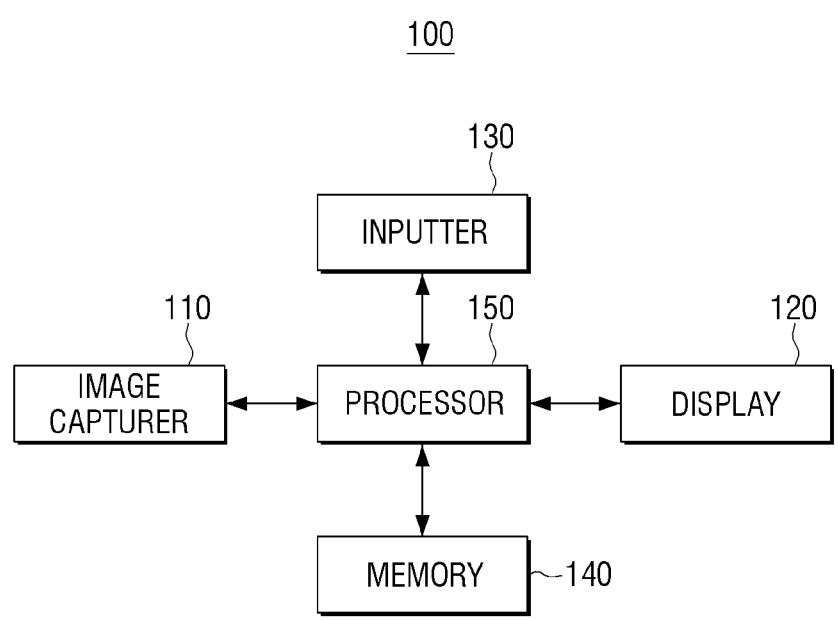
FIG. 1 is a block diagram illustrating a schematic configuration of an electronic device 100 according to an embodiment of the disclosure.

The embodiment may be variously modified and have several forms. Therefore, specific embodiments of the disclosure will be illustrated in the accompanying drawings and be described in detail in the specification. However, it is to be understood that the disclosure is not limited to specific embodiments, but includes all modifications, equivalents, and substitutions without departing from the scope and spirit of the disclosure. In case that it is decided that a detailed description for the known art related to the disclosure may obscure the gist of the disclosure, the detailed description will be omitted.

Terms "first", "second", and the like, may be used to describe various components, but the components are not to be construed as being limited by these terms. The terms are used only to distinguish one component from another component.

Terms used in the disclosure are used only to describe specific embodiments rather than limiting the scope of the disclosure. Singular forms are intended to include plural forms unless the context clearly indicates otherwise. It will be further understood that terms "include" or "formed of" used in the specification specify the presence of features, numerals, steps, operations, components, parts, or combinations thereof mentioned in the specification, but do not preclude the presence or addition of one or more other features, numerals, steps, operations, components, parts, or combinations thereof.

In the embodiments, a "module" or a "-er/or" may perform at least one function or operation, and be implemented by hardware or software or be implemented by a combination of hardware and software. In addition, a plurality of "modules" or a plurality of "-ers/ors" may be integrated in at least one module and be implemented by at least one processor (not illustrated) except for a "module" or an "-er/or" that needs to be implemented by specific hardware.

Hereinafter, embodiments of the disclosure will be described in detail with reference to the accompanying drawings so that those skilled in the art to which the disclosure pertains may easily practice the disclosure. However, the disclosure may be modified in various different forms, and is not limited to embodiments described herein. In addition, in the drawings, portions unrelated to the description will be omitted to obviously describe the disclosure, and similar reference numerals will be used to describe similar portions throughout the specification.

Meanwhile, before describing the disclosure in detail, terms used in the disclosure will be defined. First, a handwriting image refers to an image included in a marker object. For example, the handwriting image may be a shape drawn by a user. The marker object is a standardized object. Here, the standardization refers to a standard size of an object. For example, the marker object may be a sheet of A4 paper. A marker object image is a virtual object arranged in a space image. A product refers to an object arranged or to be arranged in an actual space of the space image, and a product image refers to a virtual object arranged or to be arranged in the space image.

The marker object and the handwriting image are not limited to the examples described above, and may have various forms.

Hereinafter, the disclosure will be described in detail with reference to the accompanying drawings.

FIG. 1 is a block diagram illustrating a schematic configuration of an electronic device 100 according to an embodiment of the disclosure. Here, the electronic device 100 may include at least one of, for example, a smartphone, a tablet personal computer (PC), a mobile phone, an image phone, a desktop personal computer (PC), a laptop personal computer (PC), or a netbook computer.

As illustrated in FIG. 1, the electronic device 100 includes an image capturer 110, a display 120, an inputter 130, a memory 140, and a processor 150.

The image capturer 110 is a component capturing an image of an interior space or the like for arranging a product. Specifically, the image capturer 110 may capture an image of an interior space including a marker object. Here, the marker object may further include a handwriting image.

The marker object may be used to obtain information on a size and a perspective of a space image. Here, the marker object is a standardized object. For example, the marker object may be a sheet of A4 paper with a width of 210 mm and a length of 297 mm. Because an actual size of the marker object is given, it is possible to obtain a size and a perspective of the space image based on a size of a marker object image included in the space image, and determine a size and a perspective of a product image to be newly synthesized.

The display 120 may display various images. Specifically, the display 120 may display an image in which the space image and the product image, captured by the image capturer 110, are synthesized with each other.

The inputter 130 may receive various user commands. The inputter may be implemented in various forms such as a touch inputter or a voice inputter.

The memory 140 may store a program and data for controlling the electronic device 100. In particular, the memory 140 may store one or more computer programs executed by the processor 150.

The processor 150 controls a general operation of the electronic device 100. Specifically, the processor 150 controls the electronic device 100 by executing the one or more computer programs stored in the memory 140. However, it is described in the disclosure that the processor 150 controls various components of the electronic device 100, for convenience of explanation.

First, the processor 150 may obtain a space image captured by the image capturer 110. As described above, the space image includes a marker object, and the marker object may include a handwriting image.

The processor 150 may obtain information on one or more products corresponding to the handwriting image. Specifically, the processor 150 may analyze color information and shape information of the handwriting image to obtain information on one or more products that are similar to the color information and the shape information.

Once one of information on the one or more products is selected through the inputter 130, the processor 150 may synthesize an image of the selected product in a region in which the marker object is positioned, based on size information of the selected product, size information of the marker object, and size information of a marker object image.

However, the above-described embodiment is an example briefly describing the case that an image of the marker object is captured at the front. In case that the space image is not captured at the front, the processor 150 may additionally determine perspective information (or angle information) of the marker object image.

The processor 150 may calculate a size and a perspective of a product image even in case that the space image is not captured at the front, by using perspective information of the marker object (and marker object image) in addition to the size information of the marker object (and marker object image).

The processor 150 may arrange product images with various forms in the space image by using the above-described method. Hereinafter, various embodiments in which the processor 150 adds, deletes, and changes various product images included in the space image will be described. Here, a description of a method of calculating size information and perspective information of the product image will be omitted for convenience of explanation, but the method of calculating size information and perspective information of the product image is as described above.

The processor 150 may receive a command to delete one of a plurality of product images included in the space image, through the inputter 130. The processor 150 may delete the product image specified in the deletion command according to the received input. Here, the processor 150 may synthesize a region from which the product image is deleted, based on an image pattern of a surrounding background region. Here, the product image deletion command may be a user command input by long pressing the product image, but is not limited thereto. The product image deletion command may be various types of commands input by double tapping, swiping, and the like.

Meanwhile, the processor 150 may change a first product image among the plurality of product images included in the space image with a second product image. Specifically, once the first product image is selected among the plurality of product images, the processor 150 may obtain first product information corresponding to the first product image. The processor 150 may obtain one or more other product information corresponding to the obtained first product information. Once a user command for selecting second product information among the obtained one or more product information is input, the processor 150 may delete the first product image and then synthesize and process the second product image corresponding to the second product information in a region in which the first product image is positioned.

Here, the second product image corresponding to the second product information may be obtained based on marker object information, marker object image information, and the second product information, as described above. Meanwhile, in case that a size of the second product image is smaller than a size of the first product image, a region from which the first product image is deleted may not be completely filled with the second product image. In this case, the processor 150 may perform image synthesis on the remaining region based on an image pattern of a surrounding background, as described above.

Meanwhile, once one of the plurality of product images included in the space image is selected, the processor 150 may obtain product information corresponding to the selected product image. The processor 150 may recommend new product information based on the obtained product information.

For example, in case that a first product is a 51 inch television (TV), the processor 150 may obtain information on one or more 51 inch TVs that are different from the first product. Alternatively, in case that the first product is a blue rectangular product, the processor 150 may recommend one or more blue rectangular products that are different from the first product.

Meanwhile, once a user command specifying one of the plurality of product images included in the space image is input, the processor 150 may reposition the one product image specified in the user command (for example, the user command input by long pressing the product image). Here, the repositioning of the product includes various behaviors such as turning or reversing the product, in addition to changing a region in which the product is positioned.

Figure 2:
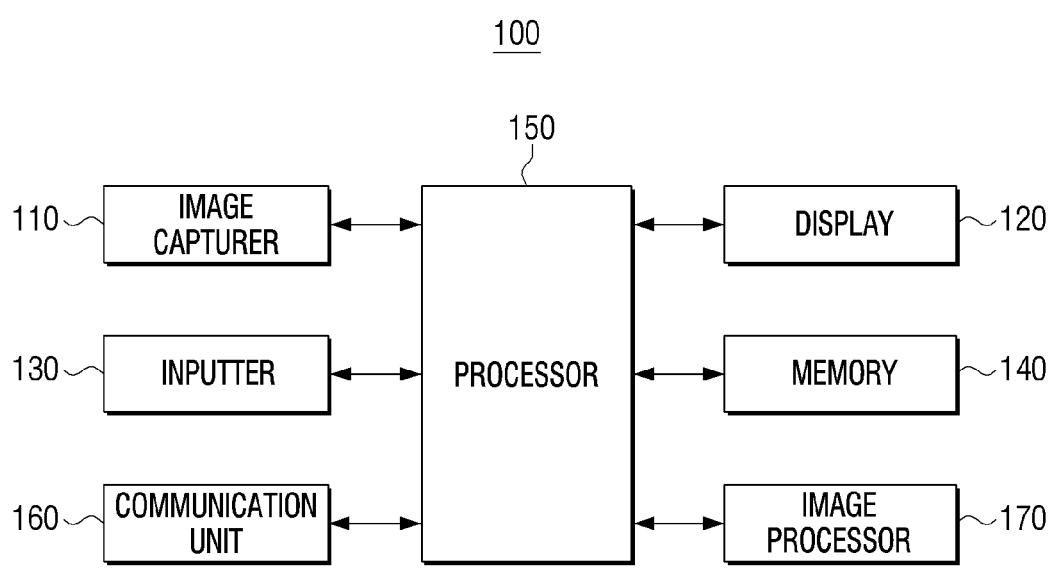
FIG. 2 is a block diagram illustrating a detailed configuration of the electronic device 100 according to an embodiment of the disclosure.

FIG. 2 is a block diagram illustrating a detailed configuration of the electronic device 100 according to an embodiment of the disclosure. As illustrated in FIG. 2, the electronic device 100 may further include a communication unit 160 and an image processor 170. However, the components illustrated in FIG. 2 are only an embodiment of the disclosure, and some components may be added or eliminated as necessary.

The image capturer 110 is a component capable of capturing an image as described above. The image capturer 110 may include a lens, a shutter, an aperture, an image sensor, an analog front end (AFE), and a timing generator (TG).

Specifically, the lens (not illustrated) is a component through which light reflected from a subject is incident, and may include at least one of a zoom lens or a focus lens. The shutter (not illustrated) adjusts a time during which light comes into the electronic device 100. An intensity of light accumulated in an exposed pixel of the image sensor is determined depending on a shutter speed. The aperture (not illustrated) is a component adjusting an intensity of light passing through the lens and incident into the electronic device 100. The image sensor (not illustrated) is a component on which an image of the subject that passes through the lens is formed.

As described above, the image capturer 110 may capture a region including a marker object including a handwriting image. Further, the image capturer 110 may obtain a space image including a marker object image corresponding to the marker object.

The display 120 may be implemented by various types of display panels. For example, the display panel may be implemented by various display technologies such as a liquid crystal display (LCD) technology, an organic light emitting diode (OLED) technology, an active-matrix organic light emitting diode (AM-OLED) technology, a liquid crystal on silicon (LcoS) technology, and a digital light processing (DLP) technology. Further, the display 120 may be a flexible display and may be coupled in at least one of a front surface region, a side surface region, or a back surface region of the electronic device 100.

The display 120 may display the space image captured by the image capturing unit 110, and in case that various product images are edited (for example, synthesized, deleted, or changed) by the processor 150, the display 120 may display the edited image.

The inputter 130 may receive a user command. The inputter 130 may be configured in various forms. For example, the inputter 130 may be implemented by a touch screen by combining with the display 120 and a touch sensor (not illustrated). However, the inputter 130 is not limited to such a configuration. The inputter 130 may include a button, may be implemented by an external remote controller or a microphone for speech input, or may combine with the image capturer 110 for motion input.

Particularly, the inputter 130 may receive a user command for editing a product image. Here, the input user command may be assigned to long pressing, double tapping, swiping, or the like.

The memory 140 may store an operating system (O/S) for driving the electronic device 100. In addition, the memory 140 may store various software programs or applications for operating the electronic device 100 according to various embodiments of the disclosure. The memory 140 may store various information such as various kinds of data input, set, or generated during execution of the programs or the applications.

In addition, the memory 140 may include various software modules for operating the electronic device 100 according to various embodiments of the disclosure, and the processor 150 may execute the various software modules stored in the memory 140 to perform an operation of the electronic device 100 according to various embodiments of the disclosure.

Further, the memory 140 may store the space image captured by the image capturer 110 and various images received from the outside. To this end, the memory 140 may include a semiconductor memory such as a flash memory, or the like, or a magnetic storing medium such as a hard disk, or the like.

The communication unit 160 may perform communication with an external device. In particular, the communication unit 160 may include various communication chips such as a wireless fidelity (Wi-Fi) chip, a Bluetooth chip, a near field communication (NFC) chip, and a wireless communication chip. Here, the Wi-Fi chip, the Bluetooth chip, and the NFC chip perform communication in a local area network (LAN) scheme, a Wi-Fi scheme, a Bluetooth scheme, an NFC scheme, respectively. In case of using the Wi-Fi chip or the Bluetooth chip, various connection information such as a service set identifier (SSID) and a session key is first transmitted and received, communication connection is established using the connection information, and various information may then be transmitted and received. The wireless communication chip means a chip performing communication according to various communication protocols such as Institute of Electrical and Electronics Engineers (IEEE), Zigbee, $3^{rd}$ generation (3G), $3^{rd}$ generation partnership project (3GPP), and long term evolution (LTE). Particularly, the communication unit 160 may receive various information from an external device (for example, a content server providing a product image). For example, the communication unit 160 may receive various interior images, product information, and product images from the external device, and store the received information in the memory 140.

The image processor 170 may process raw image data captured by the image capturer 110 to convert the raw image data into YCbCr data. Further, the image processor 170 may determine an image black level and adjust a sensitivity ratio for each color. In addition, the image processor 170 may adjust a white balance level and perform gamma correction, color interpolation, color compensation, and resolution conversion.

Particularly, the image processor 170 may edit (for example, add, delete, or change) a product image in a space image to create a new image. It is a matter of course that the image processor 170 may also be implemented by a computer program stored in the memory 140 and at least one processor executing the stored computer program.

Further, the electronic device 100 may additionally include various components such as various types of sensors (for example, an acceleration sensor, a gyro sensor, and an illuminance sensor), an outputter (for example, an audio outputter), and a vibrator.

The processor 150 controls a general operation of the electronic device 100.

The processor 150 may include a random access memory (RAM), a read only memory (ROM), a main central processing unit (CPU), first to n-th interfaces, and a bus. Here, the RAM, the ROM, the main CPU, the first to n-th interfaces, and the like may be connected to one another through the bus.

An instruction set for booting a system, or the like, is stored in the ROM. Once a turn-on command is input to supply power, the main CPU may copy the O/S stored in the memory 140 to the RAM according to an instruction stored in the ROM, and execute the O/S to boot the system. Once the booting is completed, the main CPU copies various application programs stored in the memory 140 to the RAM, and executes the application programs copied to the RAM to perform various operations.

The main CPU accesses the memory 140 to perform booting using the O/S stored in the memory 140. In addition, the main CPU performs various operations using various programs, contents, data, and the like, stored in the memory 140.

The first to n-th interfaces are connected to the various components described above. One of the interfaces may be a network interface connected to an external device through a network.

Hereinafter, a method of arranging a product image according to the disclosure will be described in detail with reference to FIGS. 3a to 12.

FIGS. 3a to 4c are views for describing a method of arranging a product image by using a marker object according to an embodiment of the disclosure.

Figure 3A:
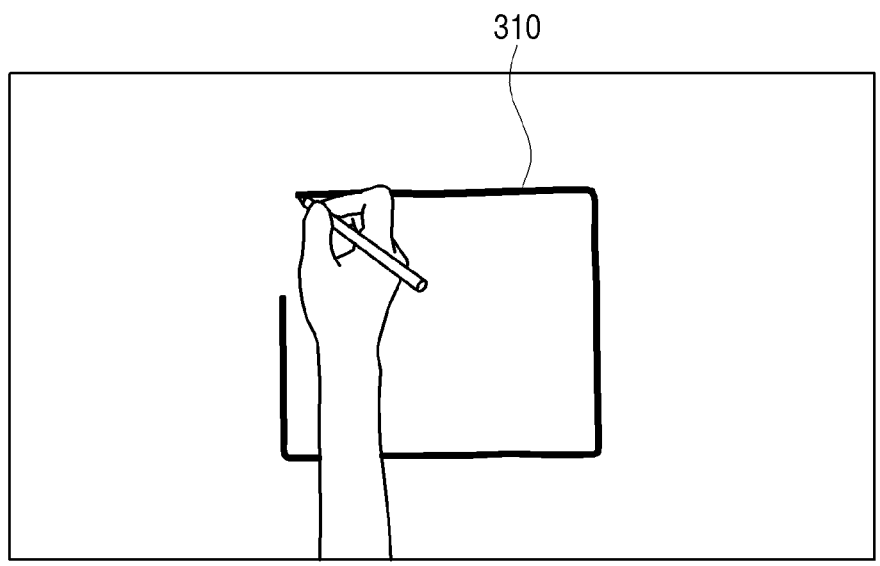
FIGS. 3A, 3B, 3C, 4A, 4B, and 4C are illustrative views for describing a method of arranging a product image by using a marker object according to an embodiment of the disclosure.
Figure 3B:
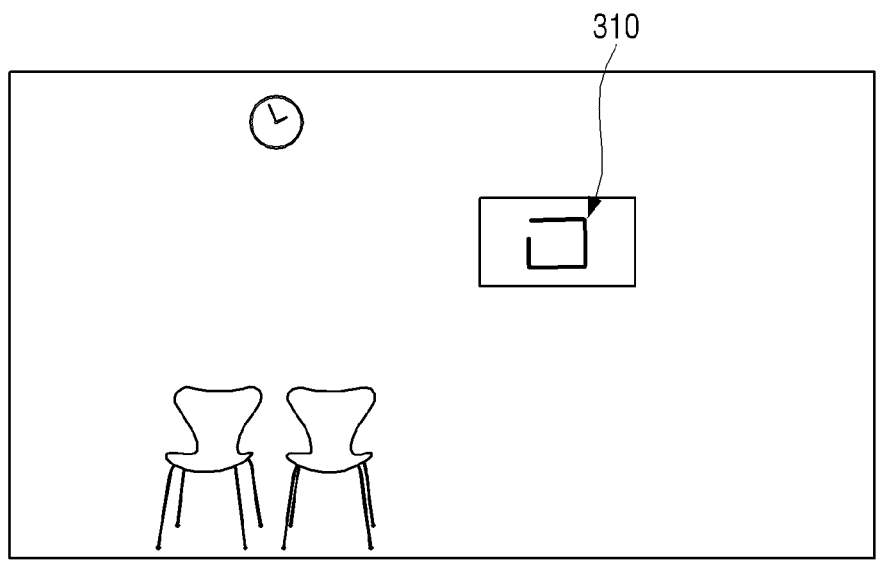

As illustrated in FIG. 3a, the user may draw, on a marker object (for example, a sheet of A4 paper), a shape (handwriting image 310) of a product that the user desires to arrange. Here, the handwriting image 310 includes shape information and color information. For example, in FIG. 3a, the handwriting image may be an image having a yellow horizontally long rectangular shape. As illustrated in FIG. 3b, the user may position a marker object in a specific region (for example, a wall) of a space (for example, a living room) in which a product is to be arranged. The electronic device 100 may capture the space including the marker object to obtain an image of the space.

The electronic device 100 may synthesize a product image with a space image. Specifically, the electronic device may obtain one or more product information corresponding to the handwriting image by analyzing the handwriting image 310. Here, the one or more product information may be product information stored in the memory 140 or product information stored in an external server. The product information may be obtained by using information on a position where the marker object is attached, in addition to the handwriting image 310. For example, in case of FIG. 3c, the marker object is attached to the wall, and thus the electronic device 100 may obtain information on a product that may be arranged on a wall.

The electronic device 100 may display one or more product information. In case that one of the one or more product information is selected, the electronic device 100 may generate a product image corresponding to the selected product information. As described above, the product image may be obtained based on actual size information of the marker object, size information and perspective information of the marker object image included in the space image, and actual size information of the selected product.

Specifically, the electronic device 100 may calculate a size of the product image with respect to the size of the product based on a ratio of the size of the marker object image to the actual size of the marker object. For example, in case that the marker object is a sheet of A4 paper with a width of 210 mm and a length of 297 mm, the captured marker object image has a width of 105 mm and a length of 148.5 mm (that is, (marker object)/(marker object image) =2), and the selected product is a 55 inch TV with a width of 1220 mm and a length of 690 mm, the product image may have a width of 610 mm and a length of 345 mm.

Figure 3C:
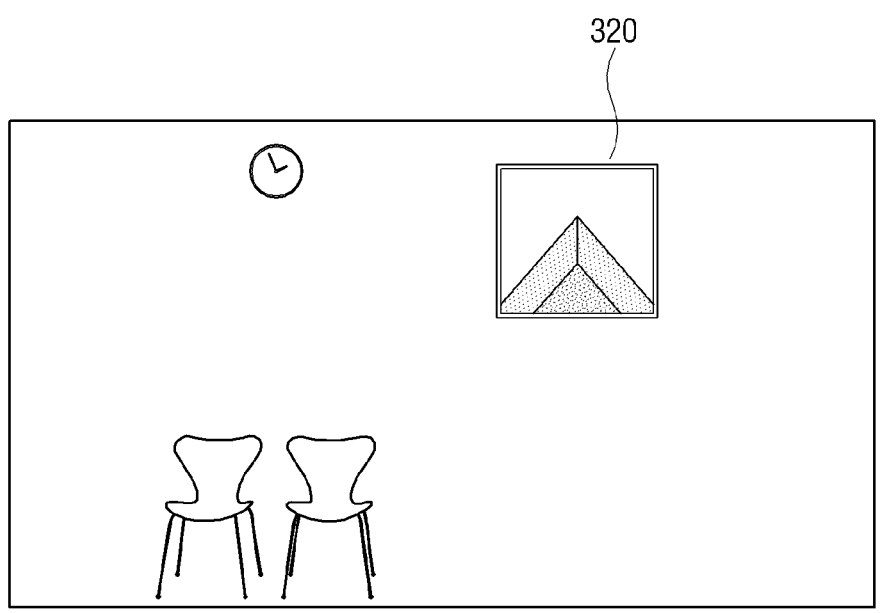

Meanwhile, as illustrated in FIG. 3c, the electronic device 100 may determine a product corresponding to the handwriting image 310 as a TV product, and synthesize a TV image corresponding to the determined TV product with the space image. Here, the TV image may be synthesized in a region in which the marker object is positioned.

Figure 4A:
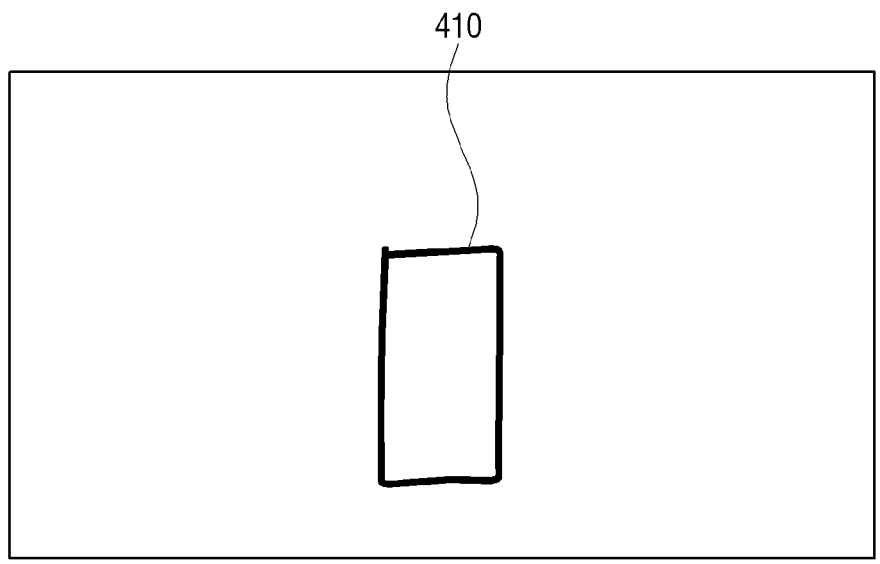
Figure 4B:
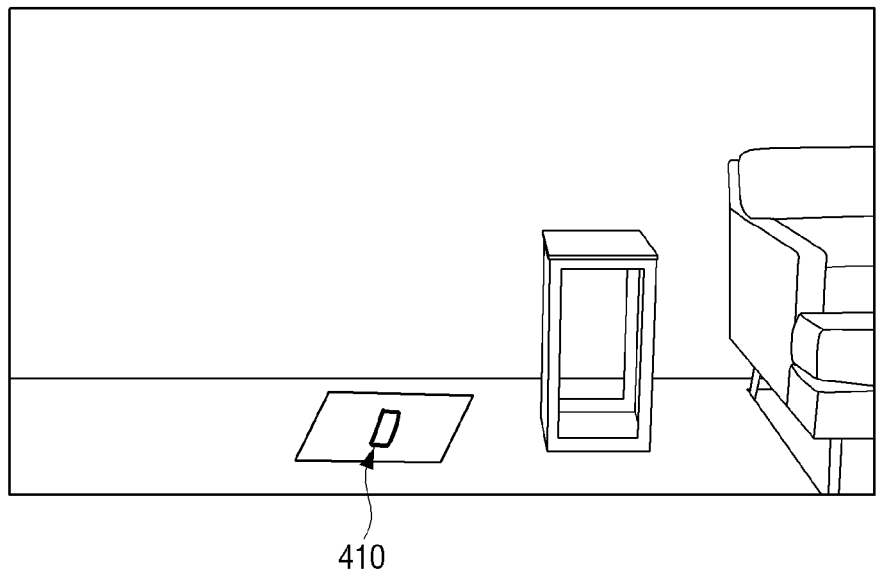
Figure 4C:
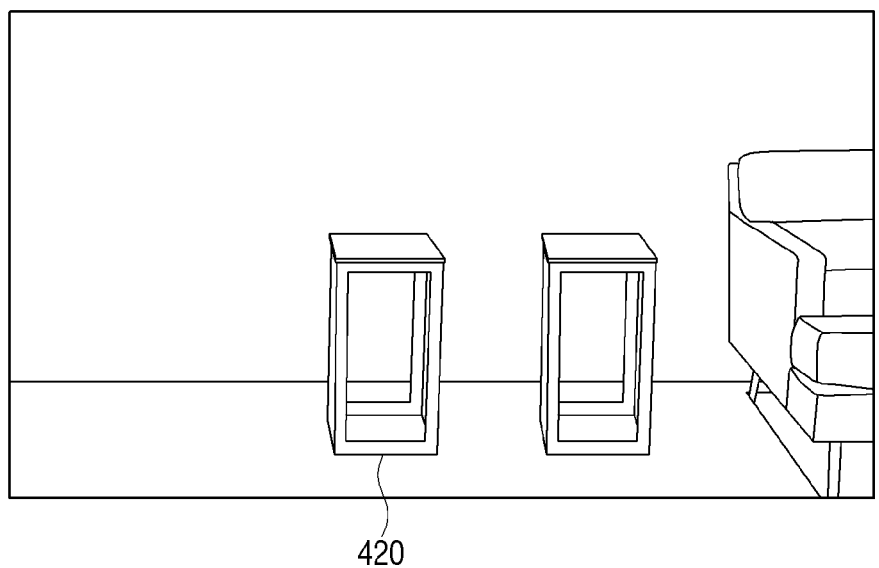

FIGS. 4a to 4c illustrate another embodiment of the case that a marker object is arranged on a floor.

As illustrated in FIG. 4a, the user may draw, on a marker object (for example, a sheet of A4 paper), a shape (handwriting image 410) of a product that the user desires to arrange. Here, the handwriting image 410 includes shape information and color information. For example, in FIG. 4a, the handwriting image 410 may be an image having a blue vertically long rectangular shape.

As illustrated in FIG. 4b, the user may position a marker object in a specific region (for example, a floor) of a space (for example, a living room) in which a product is to be arranged. The electronic device 100 may capture the space including the marker object to obtain an image of the space.

Similarly to the method as illustrated in FIGS. 3a to 3c, the electronic device 100 may determine a product corresponding to the handwriting image 410 as a furniture product 420, and synthesize a furniture image 420 with the space image as illustrated in FIG. 4c. Here, the furniture image may be synthesized in a region in which the marker object is positioned.

Figure 5A:
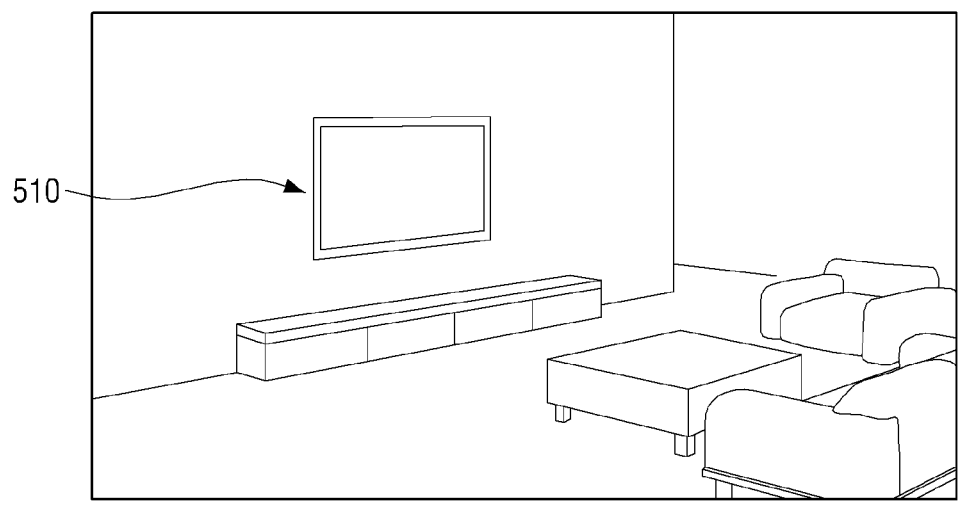
FIGS. 5A and 5B are illustrative views for describing a method of changing a product image included in an image with another product image according to an embodiment of the disclosure.
Figure 5B:
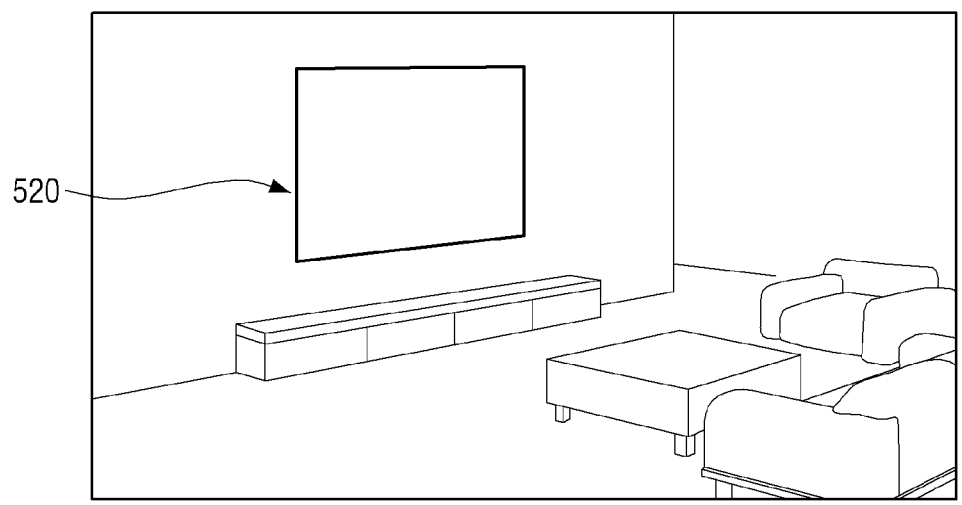

FIGS. 5a and 5b are illustrative views for describing a method of changing a product image included in an image with another product image.

Specifically, as illustrated in FIG. 5a, the electronic device 100 may recognize a TV image 510 included in an image. Here, a method of recognizing a TV may be various. According to an embodiment, the electronic device 100 may recognize a TV included in a space image by using the fact that a screen size ratio of a general digital TV is 16:9. Specifically, the electronic device 100 may recognize an image having a size ratio of 16:9 among a plurality of product images included in the space image, as the TV image 510. However, the disclosure is not limited thereto, and the electronic device 100 may also recognize the TV by analyzing color information included in the space image. For example, in case that the TV in the space image has a black screen, a rectangular image including black color information may be recognized as a TV image. Further, even in case that a product included in the space image is not a TV, the electronic device 100 may obtain a product image by analyzing main features of the corresponding product. For example, in case that a product included in the space image is a chair, the electronic device 100 may analyze features such as chair legs, a chair backrest, and a chair seat which are main components of the chair. Here, for product analysis, the electronic device 100 may store information on various products or may receive information on various products from an external server or the like.

As illustrated in FIG. 5b, in case that the electronic device 100 recognizes the TV image 510 included in the space image and another TV product is selected by the user, the electronic device 100 may synthesize a new TV image 520, instead of the existing TV image 510, in a region in which the existing TV image 510 is present. Here, in case that information (size information, product information, and the like) on a TV corresponding to the existing TV image 510, and information on a new TV are input, the electronic device 100 may synthesize an accurate TV image 520 by using the above-described information. That is, in this case, the information on the existing TV may serve as a marker object.

Meanwhile, although the case that the marker object is not included in the space image has been described in FIGS. 5a and 5b, it is a matter of course that the electronic device 100 may determine a size of the existing TV image 510 and a size of the new TV image 520 by using an image including a marker object.

Figure 6A:
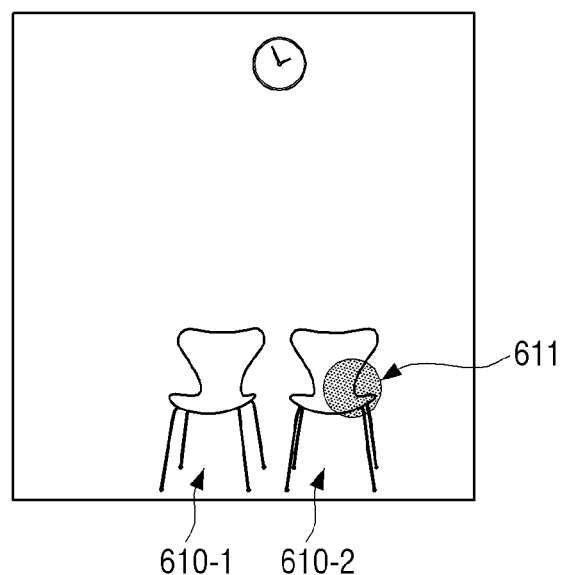
FIGS. 6A and 6B are illustrative views for describing a method of deleting a product image included in a space image according to an embodiment of the disclosure.
Figure 6B:
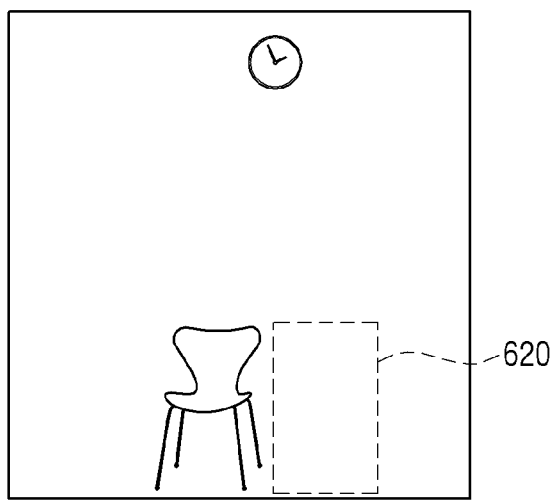

FIGS. 6a and 6b are illustrative views for describing a method of deleting a product image included in a space image according to an embodiment of the disclosure.

Specifically, as illustrated in FIG. 6a, the electronic device 100 may recognize one or more product images 610-1 and 610-2 included in a space image. Here, in case that one 610-2 of the one or more product images is selected, the electronic device 100 may delete the selected product image as illustrated in FIG. 6b.

Here, a method of deleting the product image 610-2 may be various. For example, the electronic device 100 may delete the product image 610-2 according to a command (for example, a command input by long pressing) input by touching a product image for a predetermined time. Alternatively, the electronic device 100 may delete the product image 610-2 according to a command input by dragging, that is, by touching the product image 610-2 and moving the product image 610-2 to the outside of the space image. However, the disclosure is not limited to the embodiment described above, and the product image may be deleted by various methods. For example, the electronic device 100 may delete the product image by double tapping the product image included in the space image, or may delete the product image through a UI (for example, an eraser UI) for deleting an image.

Meanwhile, as illustrated in FIG. 6b, the electronic device 100 may perform image synthesis on a region 620 from which the product image 610-2 is removed, based on an image pattern of a surrounding background region. Specifically, the electronic device 100 may analyze position information of the deletion region 620 and image pattern information of the background region to obtain information on an image pattern positioned in the deletion region 620. Once the image pattern information of the deletion region 620 is obtained, the electronic device 100 may perform image synthesis on the deletion region 620 based on the obtained image pattern.

Figure 7A:
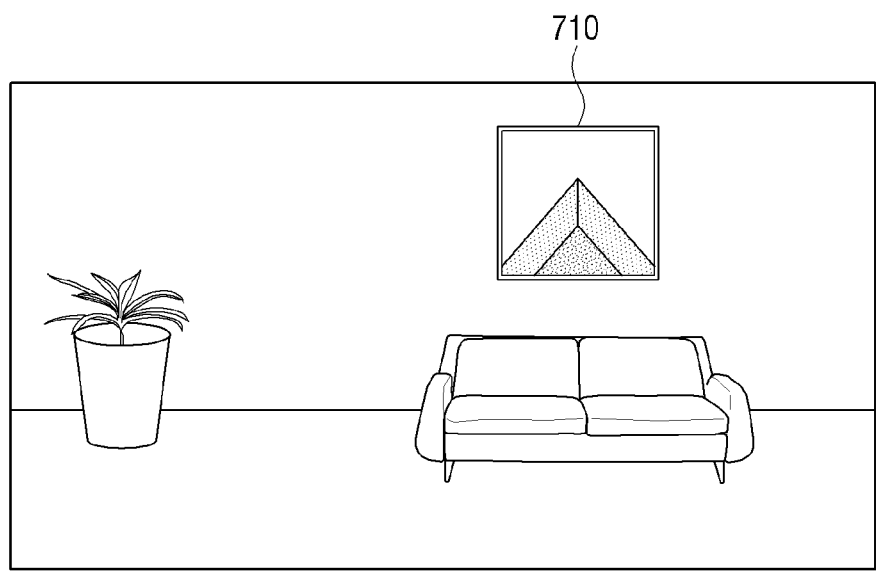
FIGS. 7A and 7B are illustrative views for describing a method of recommending a product according to an embodiment of the disclosure.
Figure 7B:
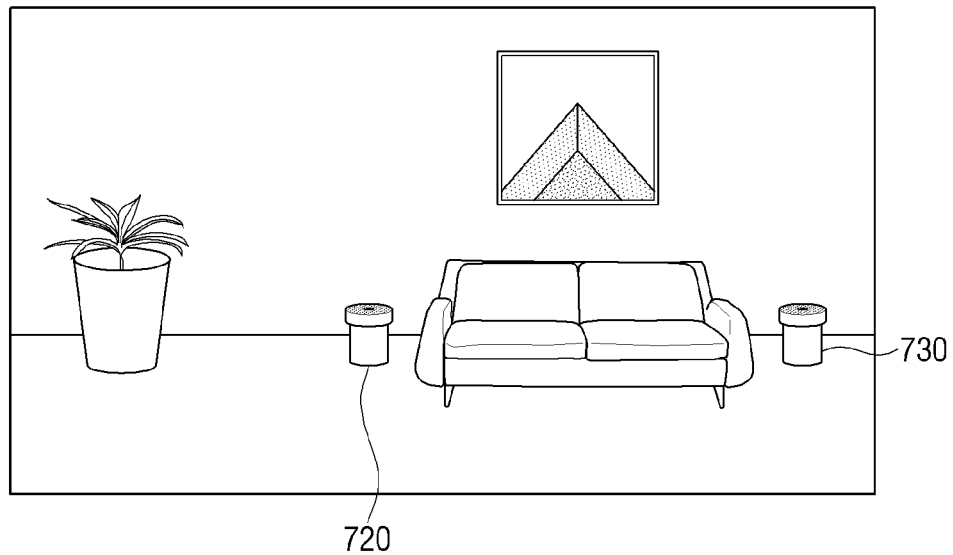

FIGS. 7a and 7b are illustrative views for describing a method of recommending a product according to an embodiment of the disclosure.

Specifically, the electronic device 100 may synthesize a product image of a desired product with a space image by using the methods described with reference to FIGS. 3a to 6b. In this case, the electronic apparatus 100 may obtain information on other products related to the synthesized product image, and recommend a product to the user.

Specifically, as illustrated in FIG. 7a, the electronic device may synthesize a product image. Here, the synthesized product image may be an image of a display device capable of performing a playback of contents. The electronic device 100 may obtain a product related to the display device based on product information corresponding to a display device image 710, and recommend the product to the user.

Specifically, as illustrated in FIG. 7b, the electronic device 100 may determine that a speaker product matches the display device image 710, and synthesize speaker product images 720 and 730 corresponding to the speaker product with the space image.

Here, the electronic device 100 may recommend a product that matches the display device, based on a recommended product list and pre-defined recommendation criteria. Specifically, the memory 140 of the electronic device 100 may store various product lists. Alternatively, the electronic device 100 may receive a product list from an external server.

Meanwhile, a pre-defined recommendation list may vary depending on a product and a space where the product is applied. According to an embodiment, the electronic device 100 may be determined depending on a product installation type, an audio type, a product type, and the like.

For example, in case that the synthesized product is a digital TV, the electronic device 100 may recommend a table for placing the digital TV based on an installation type of the digital TV. That is, in case that the digital TV is a wall-mountable TV, the electronic device 100 may not recommend a table, and in case that the digital TV is not a wall-mountable TV, the electronic device 100 may recommend a table for placing the digital TV. Alternatively, in case that the synthesized product is a digital frame, the electronic device 100 may recommend a wireless stereo system, a sound bar, or the like, that is connectable to the digital frame, based on an audio type of the digital frame. For example, in case that the digital frame includes a component for audio output, the electronic device 100 may recommend a stereo system product corresponding to the audio type of the digital frame. Alternatively, in case that the product to be synthesized is a digital frame, the electronic device 100 may recommend various accessories related to the digital frame, based on a product type. More detailed contents for product recommendation will be described below.

Figure 8A:
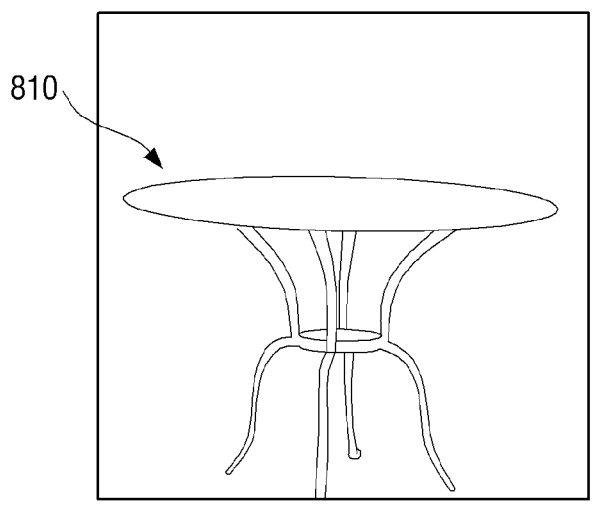
FIGS. 8A and 8B are illustrative views for describing another method of synthesizing a product image according to an embodiment of the disclosure.
Figure 8B:
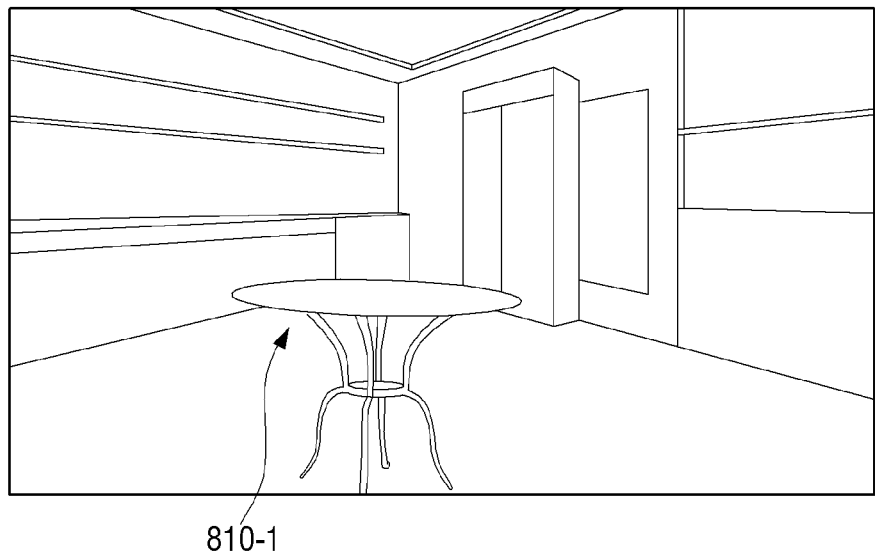

FIGS. 8a and 8b are illustrative views for describing another method of synthesizing a product image according to an embodiment of the disclosure.

The embodiment described in FIGS. 3b to 7b relates to the case that product information of a synthesized product image is stored in the memory 140. However, it is a matter of course that a product image included in an image other than a space image as illustrated in FIG. 8a may be synthesized with the space image.

Specifically, as illustrated in FIG. 8a, the electronic device 100 may extract a chair image 810 from an image including the chair image 810. As illustrated in FIG. 8b, the electronic device 100 may synthesize the extracted chair image 810 with a space image.

Here, in case that the image of FIG. 8a includes marker object or size information of the chair image 810 may be obtained, the electronic device 100 may synthesize a product image 810-1 that matches the space image of FIG. 8b. In this case, the space image of FIG. 8b also needs to include a marker object or a product of which size information may be obtained. However, in case that the size information may not be obtained, the product image 810-1 may be changed by user operation.

Figure 9A:
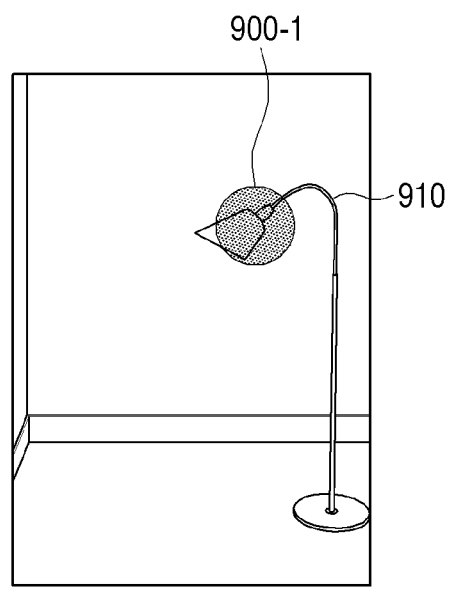
FIGS. 9A, 9B, and 9C are illustrative views for describing a method of repositioning a specific product image in a space image to another region according to an embodiment of the disclosure.
Figure 9B:
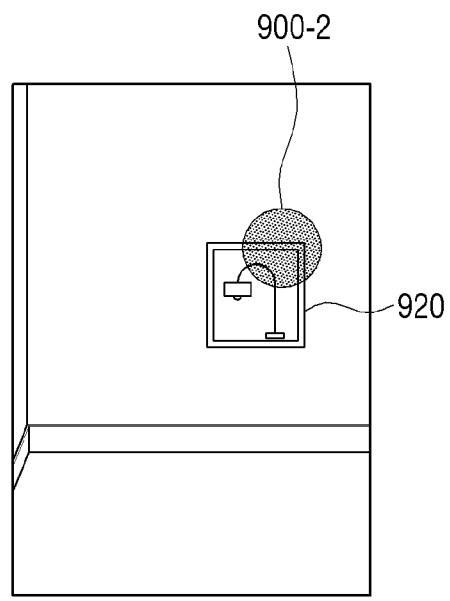
Figure 9C:
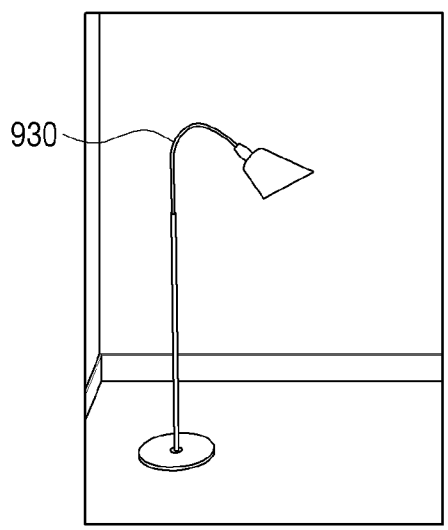

FIGS. 9a to 9c are illustrative views for describing a method of repositioning a specific product image in a space image to another region according to an embodiment of the disclosure.

Specifically, as illustrated in FIG. 9a, a space image may include a lamp image 910. The electronic device 100 may obtain the lamp image 910 by analyzing the space image.

As illustrated in FIGS. 9a and 9b, once user commands 900-1 and 900-2 for repositioning the lamp image 910 are input, the electronic device 100 may delete the lamp image 910 and change the lamp image 910 with a lamp icon 920 corresponding to the lamp image 910.

Here, the user commands 900-1 and 900-2 may have various forms. For example, the user commands 900-1 and 900-2 may be a command input by long pressing the lamp image 910, or may be various commands input by double tapping, swiping, dragging, or the like.

Once the lamp image 910 is deleted, the electronic device 100 may perform image synthesis on a region from which the lamp image 910 is deleted, based on an image pattern of a surrounding region. Meanwhile, the user command for repositioning the lamp image 910 may be a command input by touching the lamp image 910 for a predetermined time.

The electronic device 100 may edit (for example, moving, turning, resizing, or reversing the lamp image) the lamp icon 920 according to the user command. That is, as illustrated in FIG. 9c, the electronic device 100 may re-synthesize the lamp image at a desired position according to a user command.

Figure 10A:
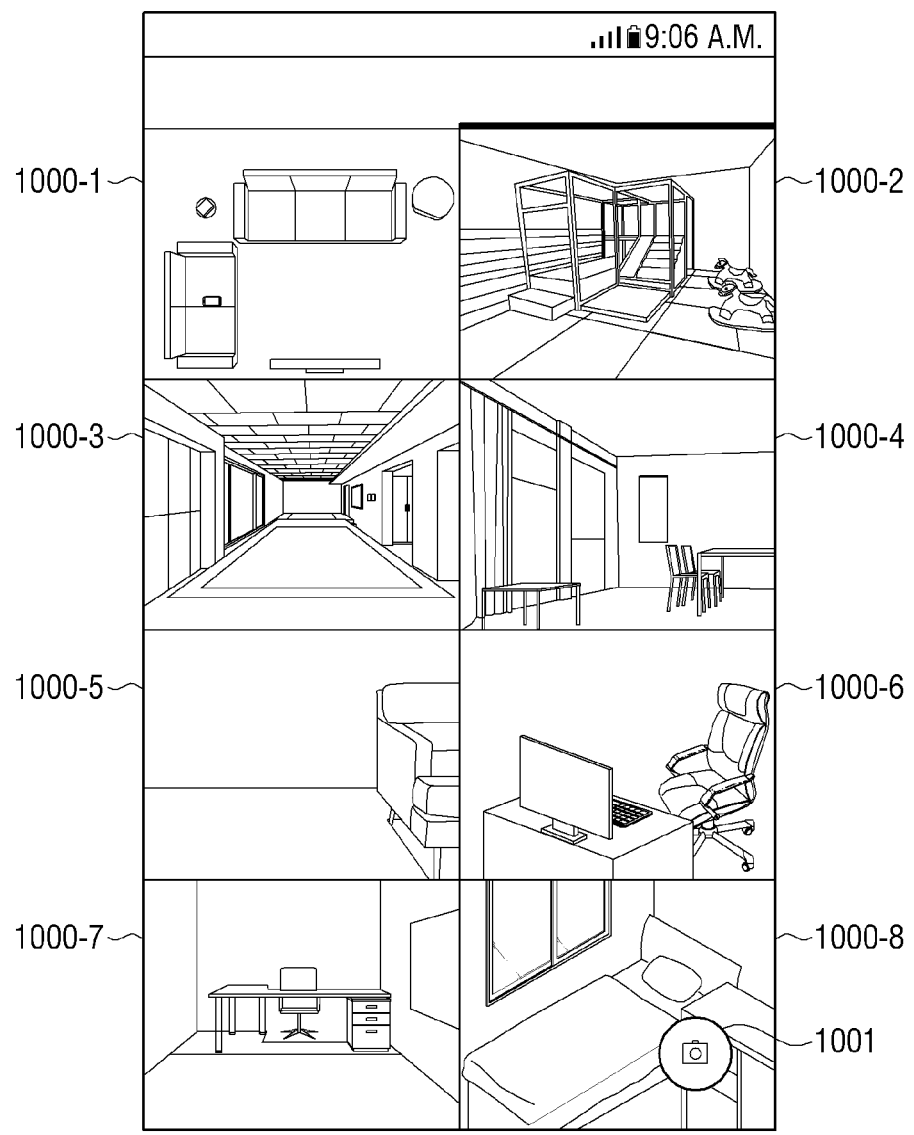
FIGS. 10A, 10B, 10C, 11A, 11B, 11C, and 11D are illustrative views for describing a method of synthesizing a virtual product image according to an embodiment of the disclosure.
Figure 10B:
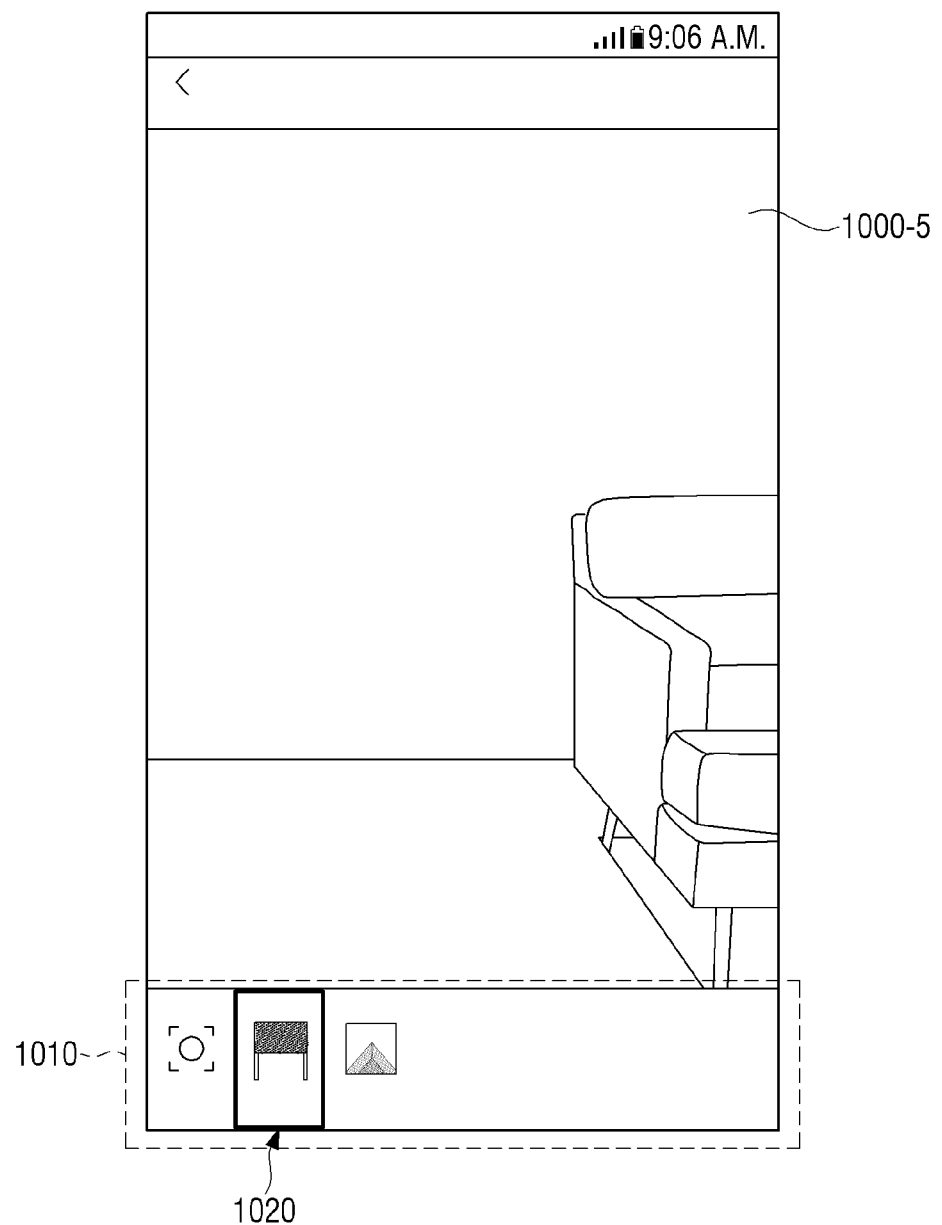
Figure 10C:
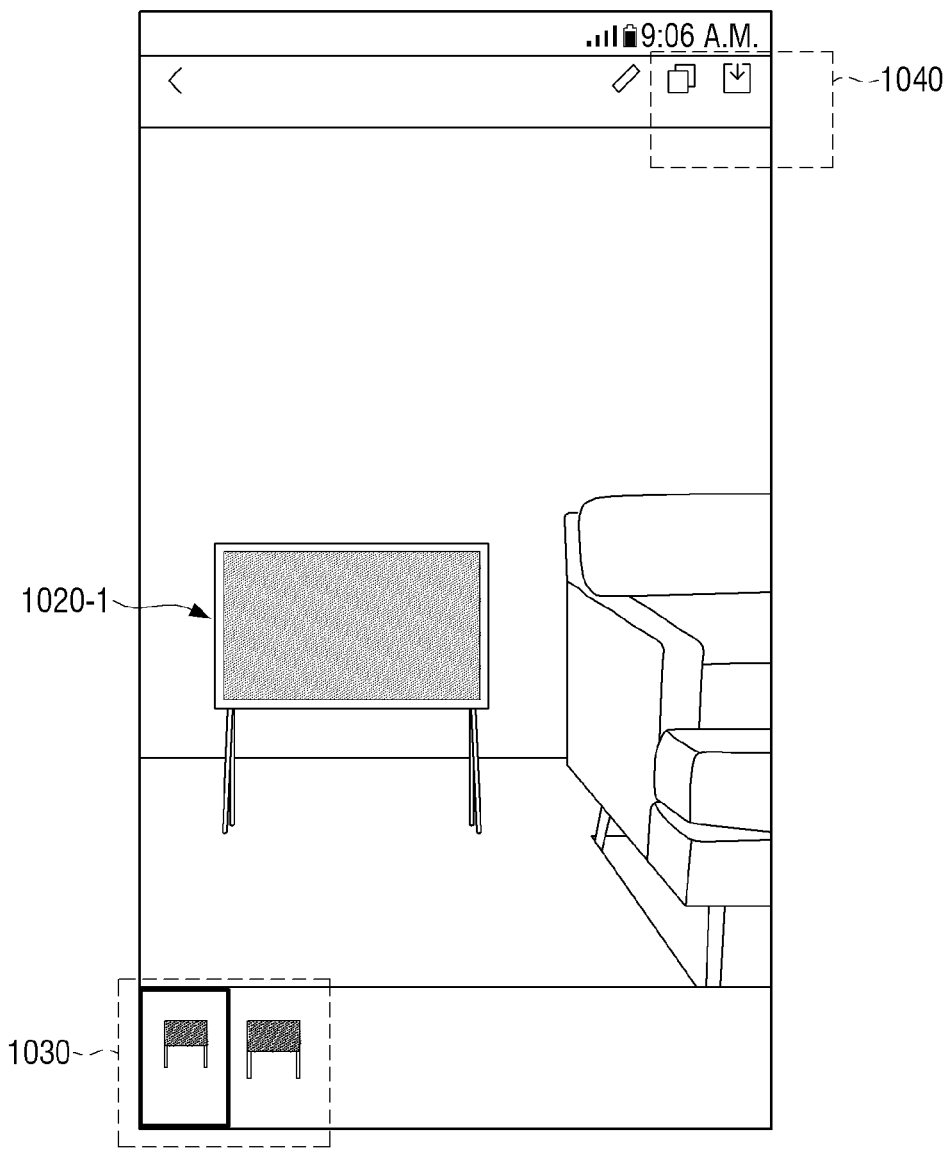

FIGS. 10a to 10c are illustrative views for describing a method of synthesizing a virtual product image according to an embodiment of the disclosure.

Specifically, as illustrated in FIG. 10a, the electronic device 100 may include a list 1000-1 to 1000-8 including space images with which a product image is to be synthesized. Here, the list including space images may include an image captured by a user and stored in the memory 140, an image received from an external server, and the like. Further, the list may further include a UI element 1001 for capturing a space image.

In case that a fifth space image 1000-5 is selected among the space images included in the list, the electronic device 100 may display a product list 1010 to be synthesized with the selected space image, as illustrated in FIG. 10b. Here, the product list 1010 may be a product list stored in the electronic device 10, or may be product list received from an external device. Further, it is a matter of course that the product list 1010 is a list of products selected by the user from a list including a plurality of products.

Further, the product list 1010 may display information (for example, a product name, a product type, a product size, and the like) on a product, in addition to an image of the product.

In case that a user command to select an electronic blackboard 1020 from the product list 1010 is input, the electronic device 100 may synthesize the electronic blackboard 1020 with the space image. Here, a position where the electronic blackboard 1020 is synthesized may be a position designated by a user command. For example, in case that a user command input by dragging to a position desired by the user is input after the user selects the electronic blackboard 1020, the electronic device 100 may synthesize the electronic blackboard 1020 at the position desired by the user.

However, the disclosure is not limited to the case that the user designates a position where the selected product is to be displayed, and it is a matter of course that the electronic device 100 may recommend a position where the electronic blackboard 1020 is to be synthesized and synthesize the electronic blackboard 1020 at the recommended position. Here, the electronic device 100 may display the recommended position where the electronic blackboard 1020 is to be synthesized, in a distinguishable manner from that of other regions. Here, in case that the user selects the recommended position, the electronic device 100 may display the electronic blackboard 1020 at the recommended position that is selected.

As illustrated in FIG. 10c, an electronic blackboard image 1020-1 synthesized according to the user command may be changed according to various embodiments described above. Meanwhile, in case that the electronic blackboard image 1020-1 is synthesized, the electronic device 100 may change the product list 1010 illustrated in FIG. 10b with a recommended product list 1030, and display the recommended product list 1030. Here, the recommended product list 1030 may include products (for example, the same product with a size different from that of the selected product, auxiliary products of the selected product, and the like) related to the selected product, recommended products (for example, other products that may be installed around the wall) that may be installed at the selected position, and the like.

In case that synthesis of the product image is completed, the electronic device 100 may store an image obtained by the synthesis. Specifically, as illustrated in FIG. 10c, once a user command assigned to a save icon 1040 is input, the electronic device 100 may store an image at a point in time at which the user command is input.

Meanwhile, FIGS. 11a to 11d are illustrative views for describing a method of arranging a new product in an image capable of expressing the product most fully.

Figure 11A:
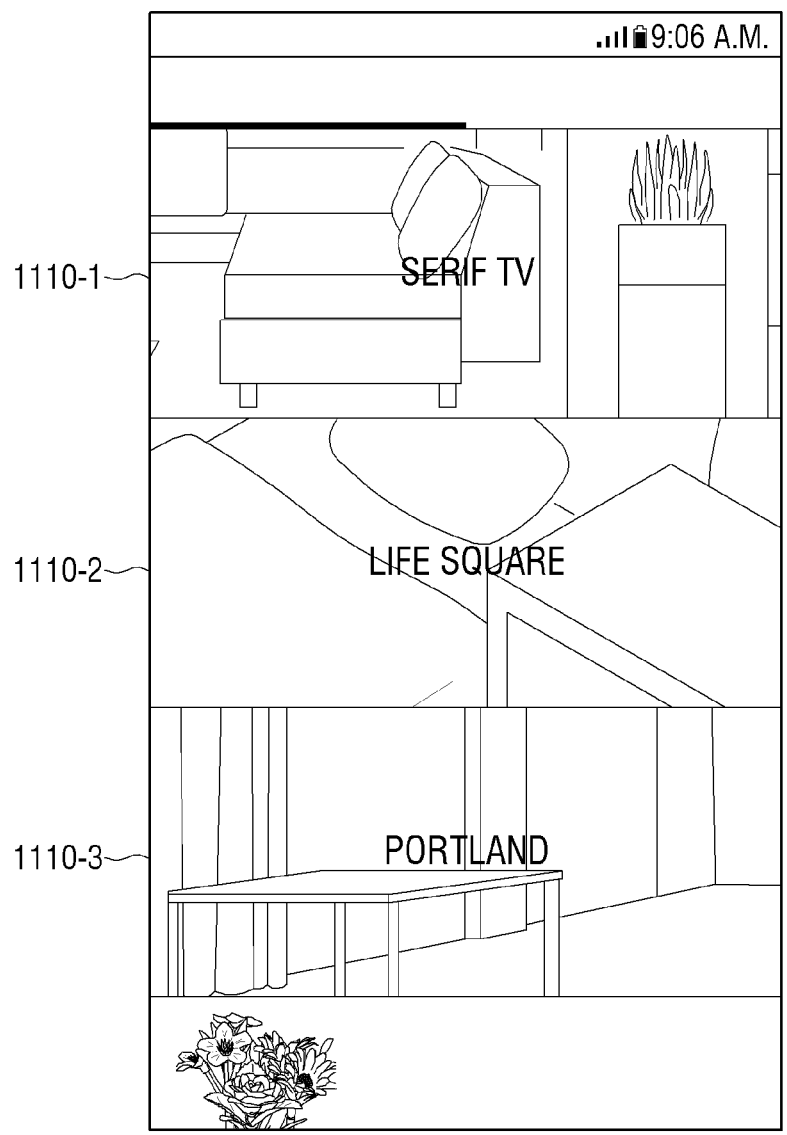

Specifically, as illustrated in FIG. 11a, the electronic device 100 may display UIs 1110-1, 1110-2, and 1110-3 classified into respective product categories. For example, the product categories may be divided into a SERIF TV UI 1110-1, a LIFE SQUARE UI 1110-2, and a PORTLAND UI 1110-3. However, the disclosure is not limited to the categories described above, and various category UIs may be further included.

Figure 11B:
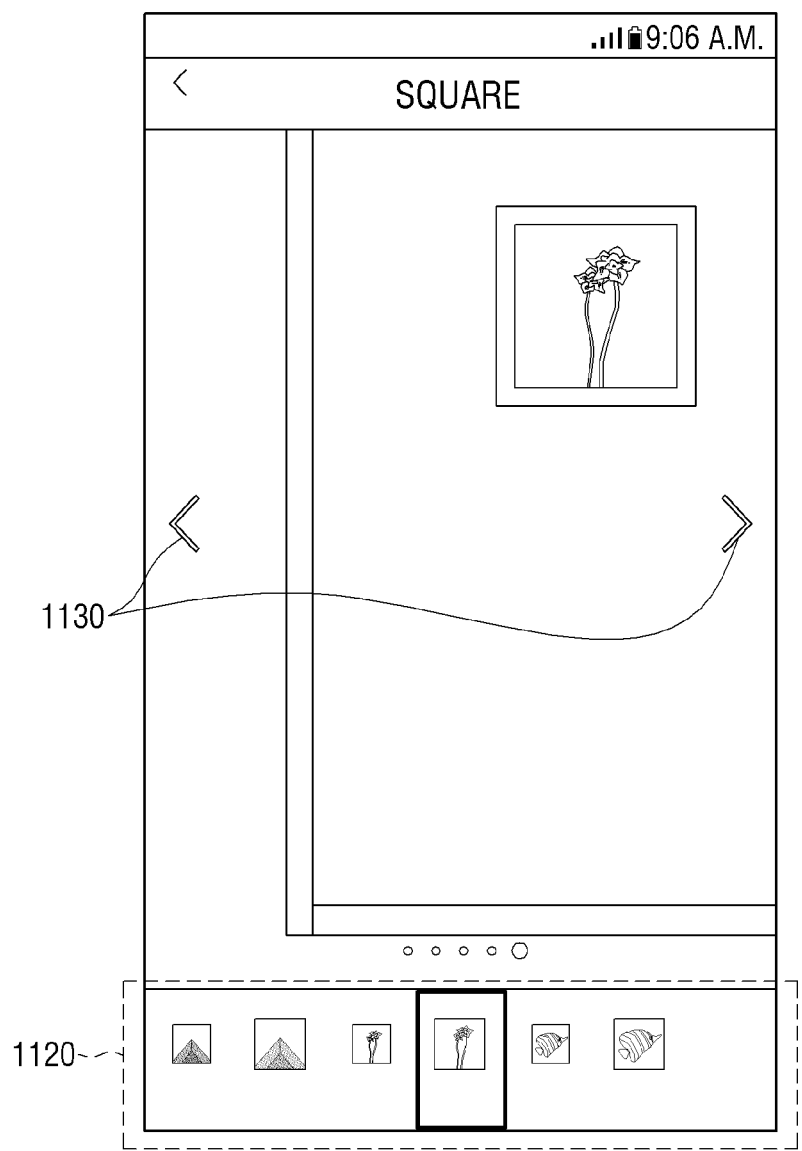

In case that a user command to select the LIFE SQUARE UI 1110-1 is input, the electronic device 100 may display a space image and a product list UI 1120 corresponding to LIFE SQUARE as illustrated in FIG. 11b. In case that one product is selected from the product list UI 1120, the electronic device 100 may synthesize an image of the selected product with the space image and display the synthesized image. Here, once a user command assigned to the product list UI 1120 is input, the electronic device 100 may change a size of the product and contents displayed on the product.

Figure 11C:
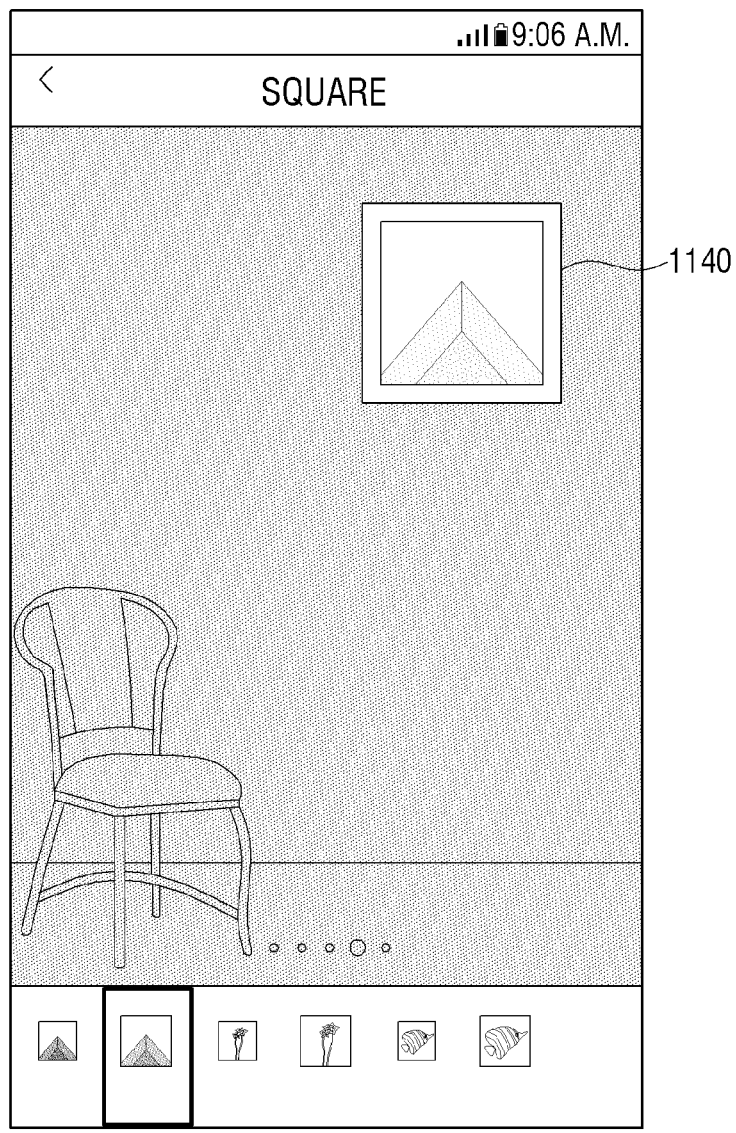

Meanwhile, once a user command assigned to left and right switching icons 1130 is input, the electronic device 100 may change and display the space image as illustrated in FIG. 11c. Here, the user command may be a command input by touching the left and right switching UIs 1130, a command input by swiping on the space image, or various other commands.

Figure 11D:
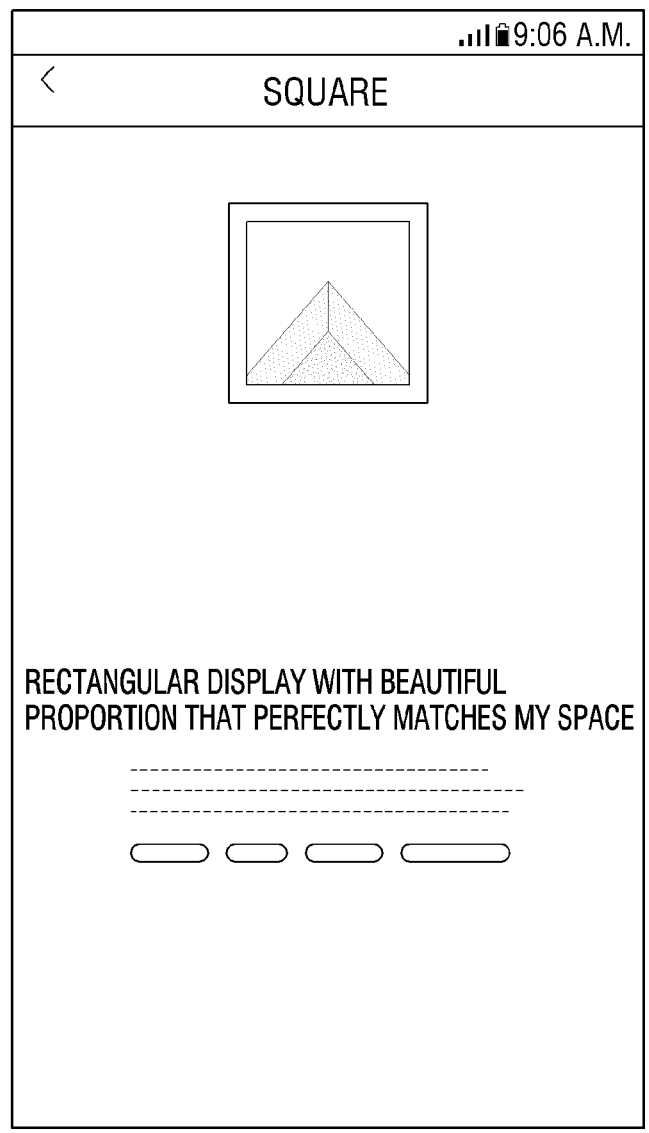

Further, once a user command input by touching the synthesized product image is input, the electronic device 100 may display detailed information on the product as illustrated in FIG. 11d. Here, the detailed information on the product may be at least one of a product advertising phrase, a product price, a product size, or a manual.

FIG. 12 is a flowchart for describing a method for synthesizing a virtual product.

Specifically, the electronic device 100 may analyze a space image (S1210). In case that the space image includes a handwriting image (S1220-Y), the electronic device 100 may analyze shape information and color information of the handwriting image and obtain information on a product corresponding to the handwriting image in a pre-stored product list (S1230).

Meanwhile, in case that the space image does not include a handwriting image (S1220-N), the electronic device 100 may determine whether or not information on a product selected by a user command exists (S1240).

In case that the information on the product corresponding to the handwriting image or the information on the product selected by the user is determined, the electronic device 100 may determine a position where a product image corresponding to the product information is to be synthesized (S1250). Here, a region in which the product image is to be synthesized may be determined by a user command, or a region recommended by the electronic device 100 through image analysis may be determined as the region in which the product image is to be synthesized.

The electronic device 100 may determine whether or not another product image is present in the region in which the product image is to be synthesized (S1260). In case that another product image is present in the region in which the product image is to be synthesized (S1260-Y), the electronic device may delete the existing product image and synthesize a new product image in the region from which the existing product image is deleted (S1270). Here, in case that a size of the existing product image is larger than a size of the new product image, the electronic device 100 may perform image synthesis on a region other than a region in which the new product image is synthesized in an existing product image region, based on an image pattern of a surrounding background region.

Meanwhile, in case that another product image is not present in the region in which the product image is to be synthesized (S1260-N), the electronic device may synthesize the new product image (S1280).

Hereinafter, a method of determining a size of a product image to be synthesized will be described in detail with reference to FIGS. 13 to 16.

As described above, in case that a marker object is included in a space image, the electronic device 100 may obtain size information of the marker object and size information of a marker object image. Therefore, the electronic device 100 may obtain size information of a product to be synthesized to calculate size information of a product image to be synthesized.

However, in case of a space image that does not include a marker object, the electronic device 100 may not obtain size information of a product image to be synthesized. In this case, the electronic device 100 may obtain information on a product corresponding to a product image included in the space image to obtain size information of a product image to be synthesized.

Specifically, the electronic device 100 may obtain a plurality of product images by analyzing the space image. Here, in case that size information of an actual product corresponding to at least one product image among the plurality of product images may be obtained, the electronic device 100 may obtain a size of a product image to be synthesized. Here, the size information of the actual product corresponding to at least one product image may be input by the user. However, the disclosure is not limited thereto, and it is a matter of course that the electronic device 100 may determine a product corresponding to a product image by analyzing the product image and obtain size information of the product based on information on the determined product.

Figure 13:
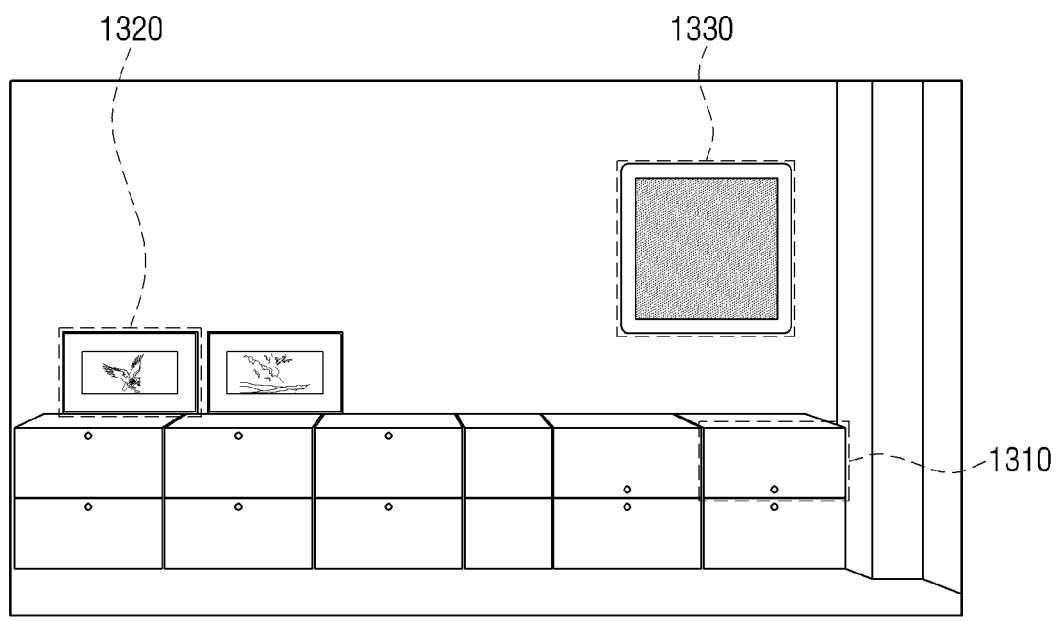
FIG. 13 is an illustrative view for describing a method of determining a size of a synthesized product image according to an embodiment of the disclosure.

Specifically, as illustrated in FIG. 13, the electronic device 100 may obtain a first product image 1310 and a second product image 1320 from a space image. The electronic device 100 may display the obtained product images in a distinguishable manner. Here, in case that an actual width (for example, 50 cm) of the first product image is input, the electronic device 100 may display actual size information of the first product image on the space image. Further, the electronic device 100 may obtain a size of a product image to be synthesized based on a size of the first product image 1310 and the size information of a first product.

That is, as illustrated in FIG. 13, a product image 1330 to be synthesized may be obtained based on the actual size information of the first product, the size information of the first product image, and actual size information of a product to be synthesized.

Meanwhile, in case that the actual size information of the first product image 1310 is input, the electronic device 100 may store a space image including the actual size information of the first product image 1310 in the memory 140. That is, the electronic device 100 may store a space image and product information of a product image included in the space image together, thereby making it possible to synthesize a product image without analyzing the space image in case of arranging a virtual product by using the same space image in future.

Meanwhile, although a method of obtaining a size of a product image to be synthesized based on a size of a product image has been described in FIG. 13, the disclosure is not limited thereto. For example, it is a matter of course that the electronic device 100 may synthesize a product image at an accurate size also in case that a reference value such as a length of a wall included in a space image or a height of a space is input.

Figure 14A:
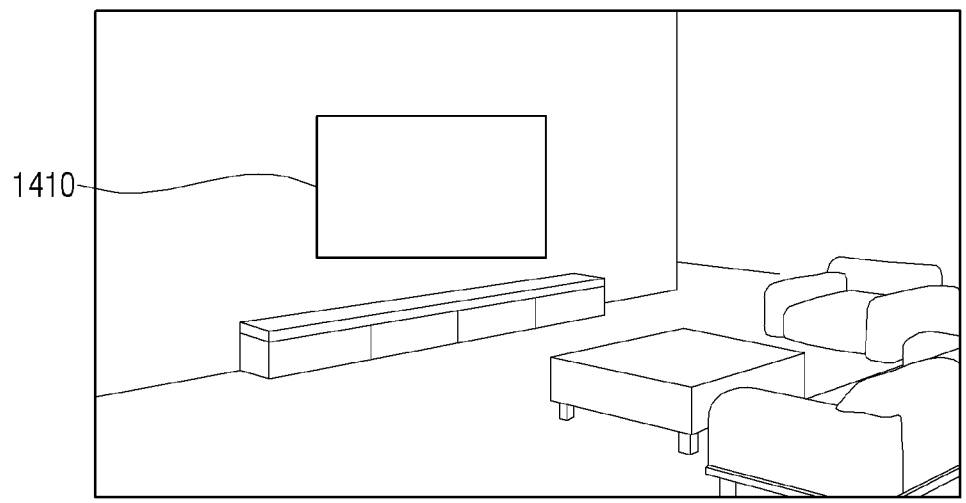
FIGS. 14A and 14B are illustrative views for describing a method of synthesizing a product image by analyzing a perspective of a space image according to an embodiment of the disclosure.
Figure 14B:
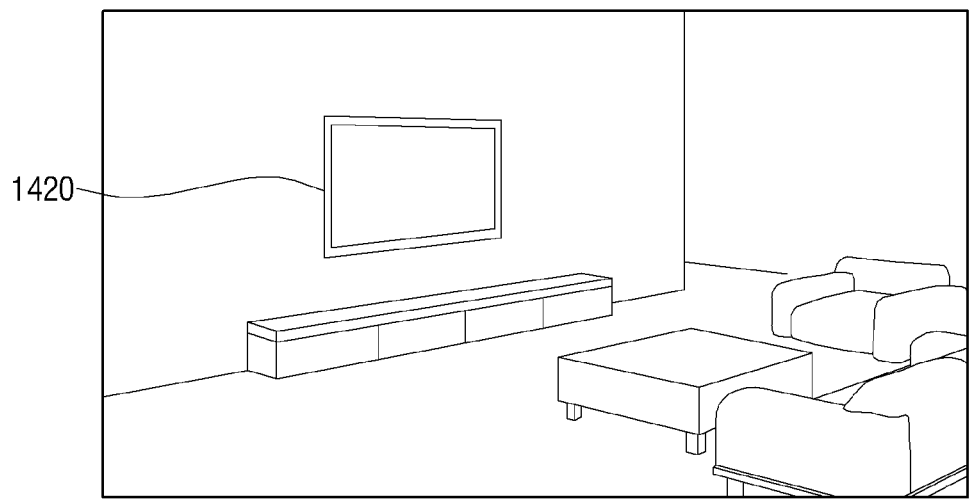

FIGS. 14*a* and 14*b* are illustrative views for describing a method of synthesizing a product image by analyzing a perspective (or angle) of a space image.

Specifically, even in case of an image of the same space, different space images are generated depending on a position and an angle at which the space is captured. Here, the electronic device 100 may synthesize an accurate product image by analyzing a perspective of a space image.

For example, as illustrated in FIG. 14*a*, in case that a perspective of a space image is not considered at the time of synthesizing a TV image 1410 on a wall on the right side, the TV image 1410 is synthesized in a form different from that of an actually arranged TV.

Therefore, as illustrated in FIG. 14*b*, the electronic device 100 may need to arrange a TV image 1420 in the same form as that of the actually arranged TV by analyzing the perspective of the space image.

Here, the perspective of the space image may be obtained by using various methods. For example, in case that the space image includes a marker object, the electronic device 100 may analyze the perspective of the space image based on a marker object image.

In case that the space image does not include a marker object, the electronic device 100 may analyze the perspective of the space image by analyzing a pattern of a wall, a boundary between a wall and a ceiling, and the like.

Figure 15A:
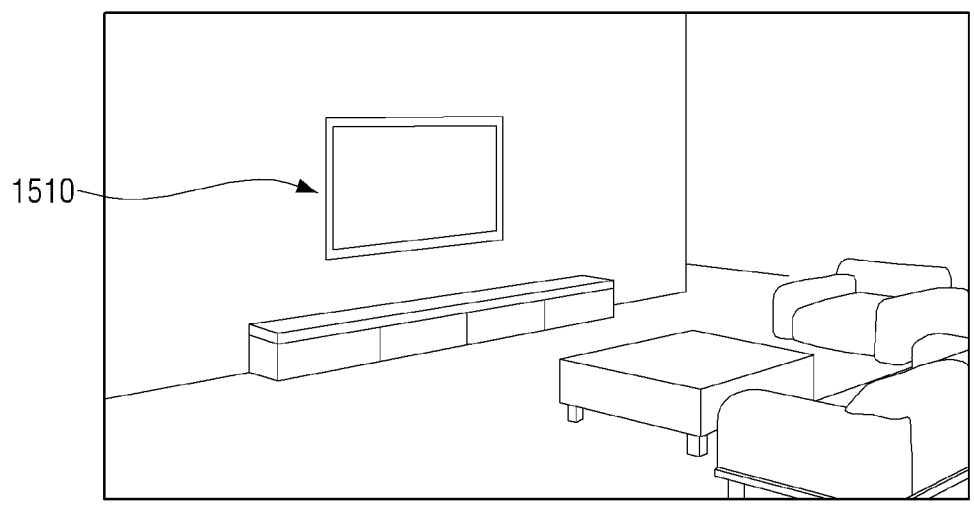
FIGS. 15A, 15B, and 15C are illustrative views for describing the case of zooming in or out a synthesized space image according to an embodiment of the disclosure.
Figure 15B:
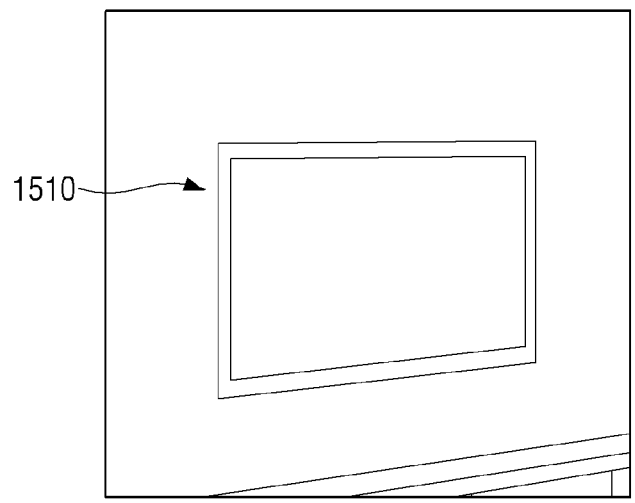
Figure 15C:
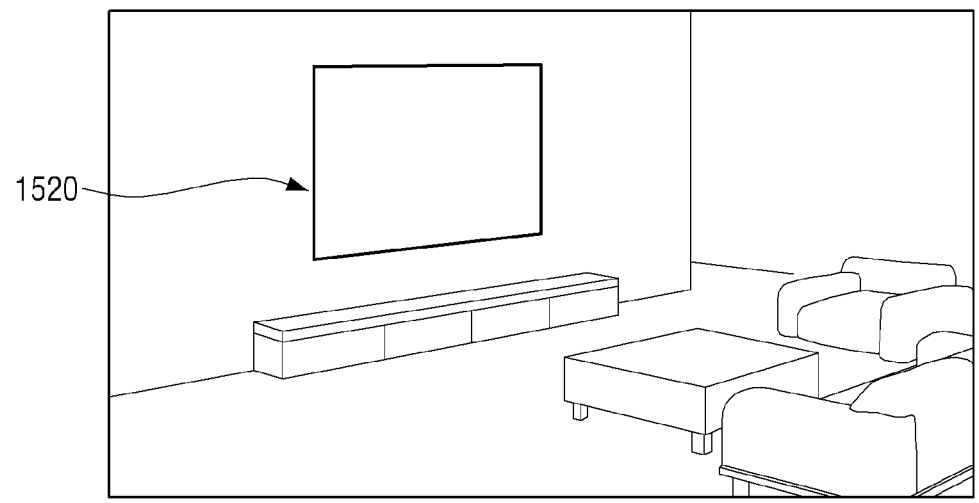

FIGS. 15*a* to 15*c* are illustrative views for describing the case of zooming in or out a synthesized space image.

Specifically, as illustrated in FIG. 15*a*, a synthesized space image may include a synthesized first product image 1510. Here, the electronic device 100 may zoom in or out the synthesized space image according to a user command. Here, the electronic device 100 may store the zoomed-in or zoomed-out space image and synthesize various product images by utilizing the stored space image.

As illustrated in FIG. 15*b*, once a user command to zoom in the synthesized space image is input, the electronic device 100 may zoom in the synthesized product image together with the synthesized space image. However, this is only an embodiment and it is a matter of course that the electronic device 100 may also zoom in or out only one of the space image or the product image.

Meanwhile, as illustrated in FIG. 15*c*, the electronic device 100 may synthesize a product image with the zoomed-in space image. Specifically, once a user command to change the first product image 1510 with a second product image 1520 is input, the electronic device 100 may adjust a size of the second product image 1520 based on a magnification of the zoomed-in space image, and synthesize the second product image 1520. That is, even in case that the space image is zoomed-in or out, the product image may be synthesized in a form in which an actual product is arranged.

Figure 16:
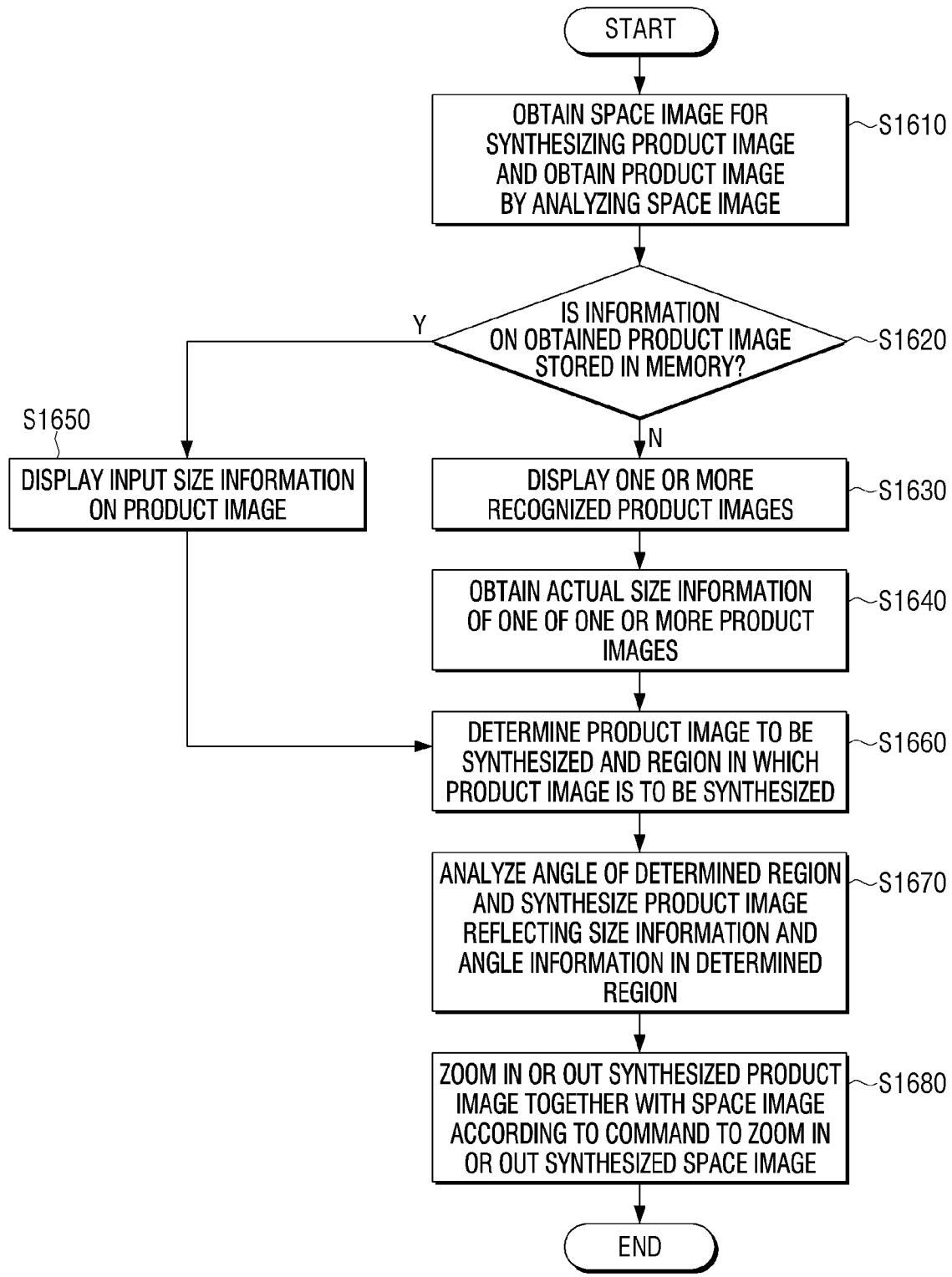
FIG. 16 is a flowchart for describing the embodiment of FIGS. 13 to 15 according to an embodiment of the disclosure.

FIG. 16 is a flowchart for describing the embodiment of FIGS. 13 to 15.

First, the electronic device 100 may obtain a space image for synthesizing a product image, and obtain a product image by analyzing the space image (S1610).

The electronic device may determine whether or not product information of the obtained product image is stored in the memory 140 (S1620).

In case that the product information of the obtained product image is not input (S1620-N), the electronic device 100 may display one or more product images obtained from the space image (S1630)

The electronic device 100 may obtain actual size information of one of the one or more product images (S1640). As described above, the actual size information of the product image may be input by the user or may be obtained through image analysis. The electronic device 100 may store the obtained size information of the product.

Meanwhile, in case that product information of the obtained product image is input (S1620-Y), the electronic device 100 may display the size information on the product image of which the size information is input (S1650).

The electronic device 100 may determine a product image to be synthesized and a region in which the product image is to be synthesized (S1660). The electronic device 100 may analyze a perspective of the determined region and synthesize a product image reflecting size information and perspective information in the determined region (S1670).

Once the product image is synthesized with the space image and a user command to zoom in or out the synthesized space image is input, the electronic device 100 may zoom in or out the synthesized product image together with the synthesized space image (S1680). Here, even in case that another product image is synthesized, the product image may be synthesized with the space image by reflecting the size information and the perspective information.

Figure 17A:
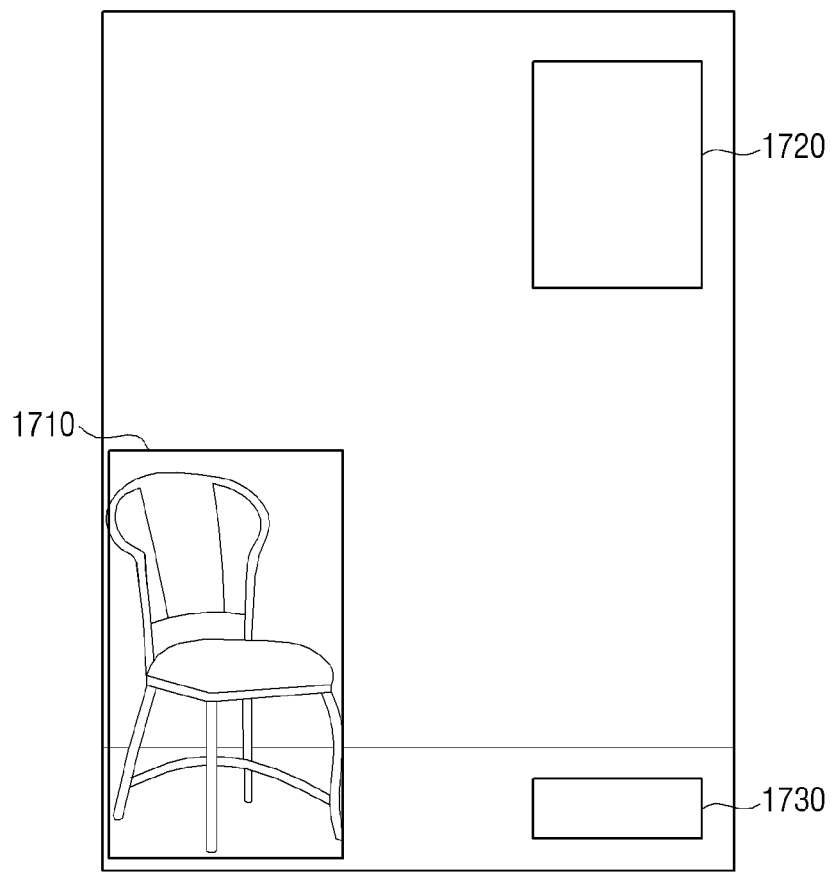
FIGS. 17A, 17B, 17C, 17D, and 18 are illustrative views for describing a method of recommending an arrangeable product by analyzing a space image according to an embodiment of the disclosure.
Figure 17B:
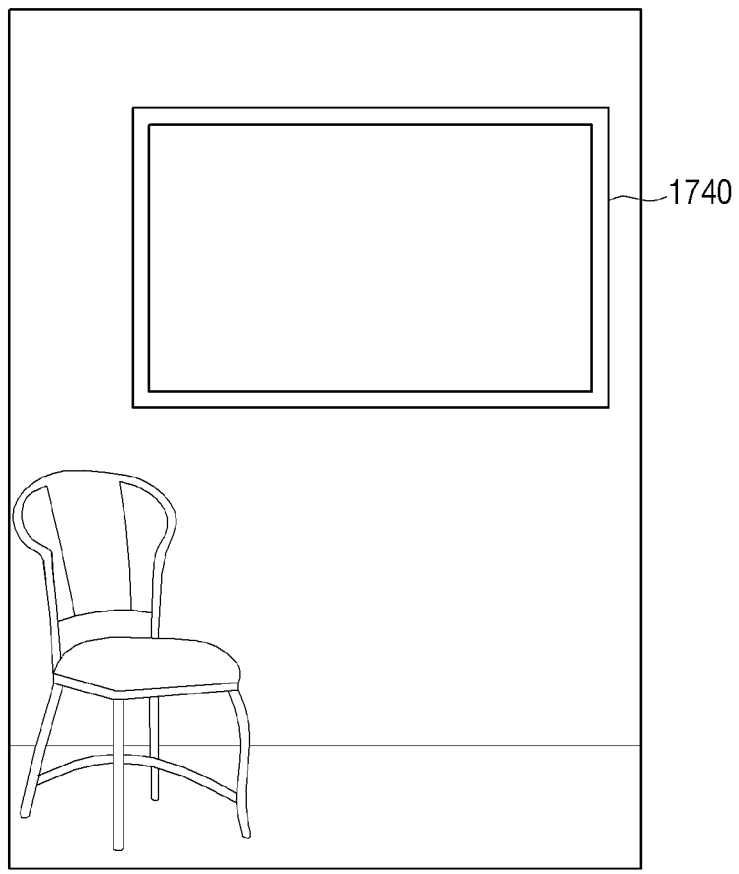
Figure 17C:
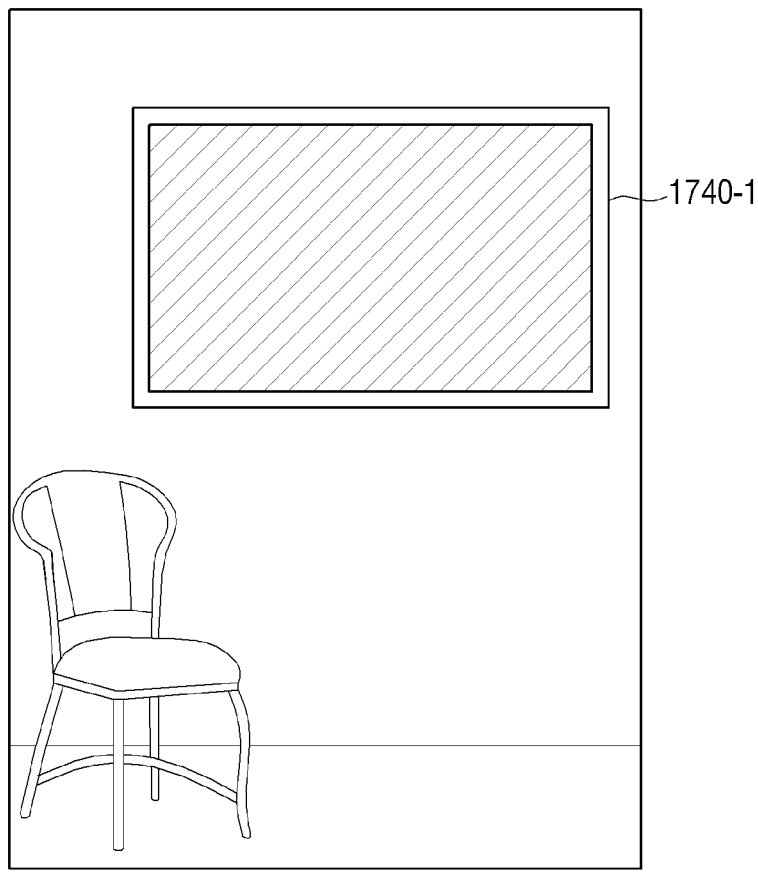
Figure 17D:
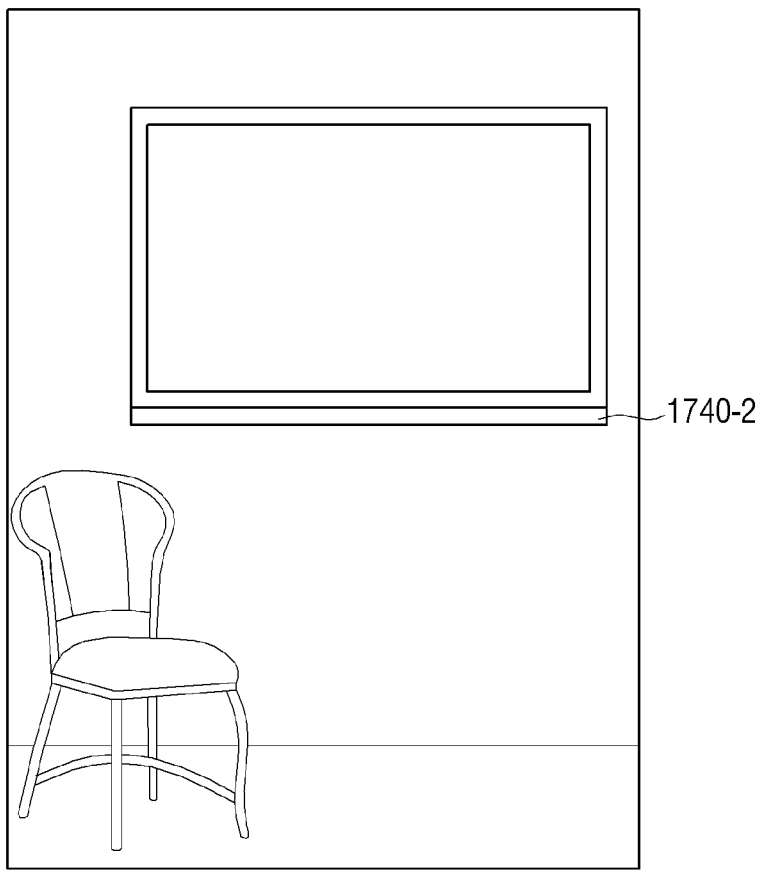
Figure 18:
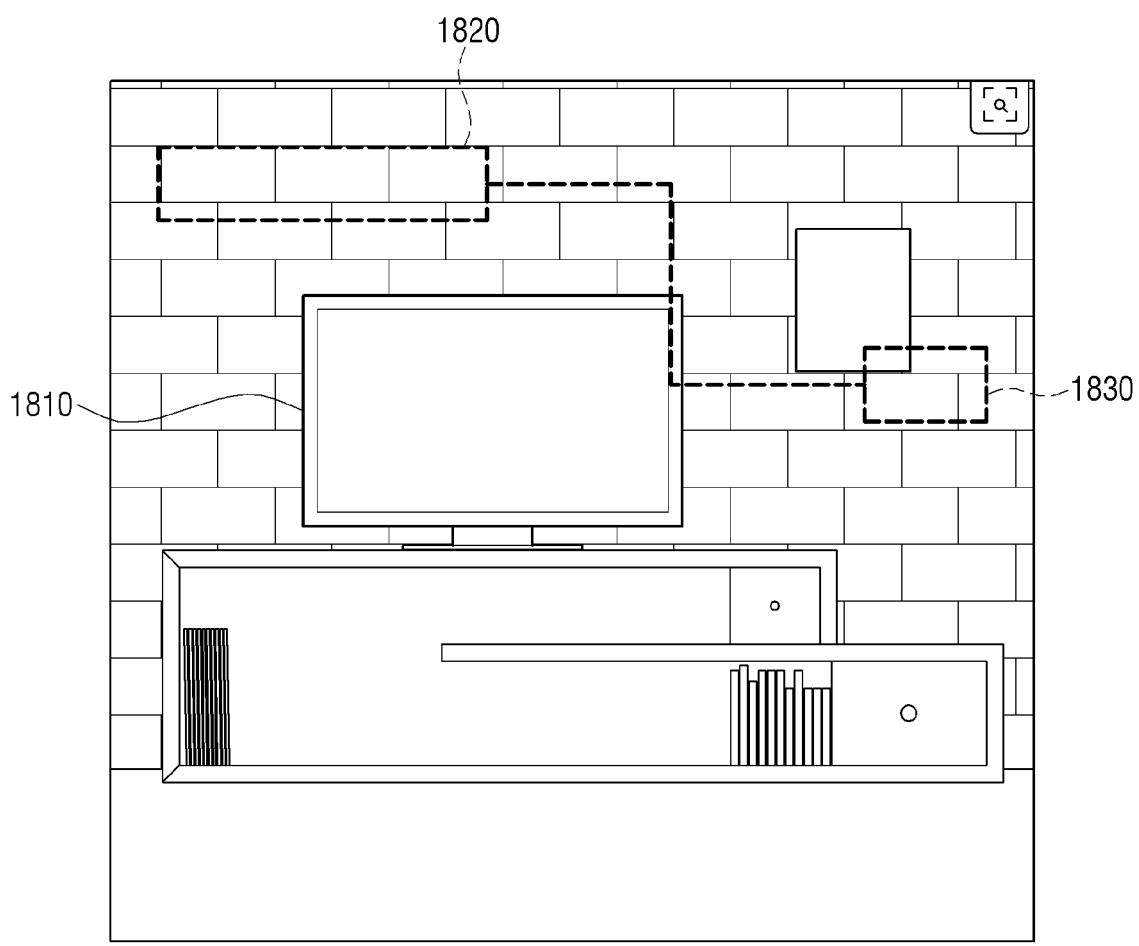
Figure 19:
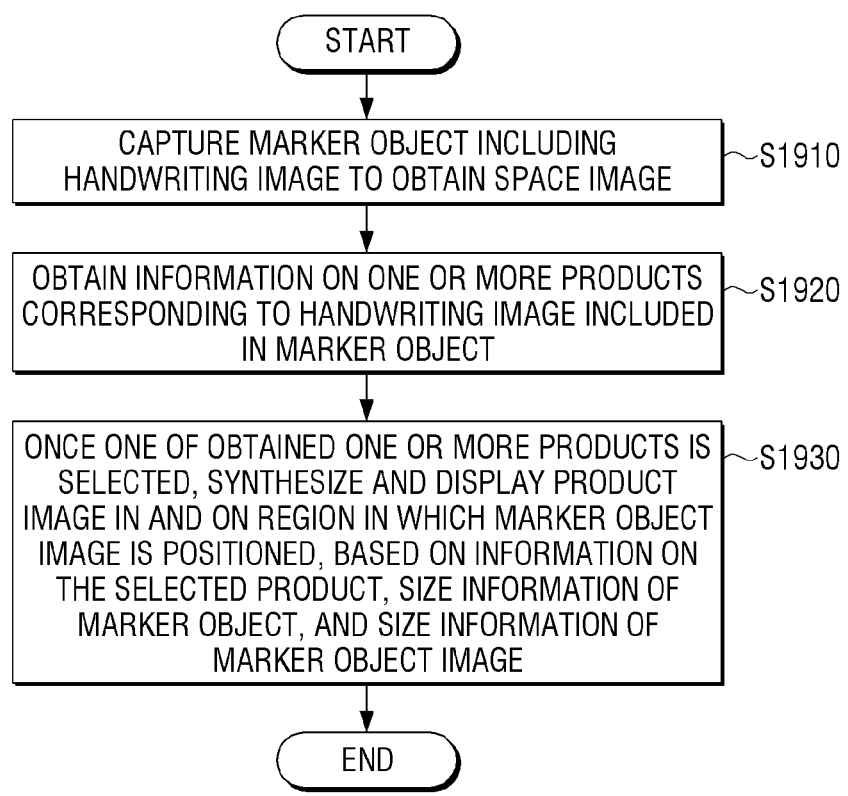
FIG. 19 is a flowchart for describing a process of synthesizing a product image according to an embodiment of the disclosure.

FIGS. 17 to 19 are illustrative views for describing a method of recommending an arrangeable product by analyzing a space image.

Specifically, the electronic device 100 may recommend a product to be arranged in a space image by analyzing color of the space image, a product image, and a density of product images. Further, in case that a recommended object is a display device such as a digital frame, the electronic device 100 may also recommend a content to be played in the display device. In addition, the electronic device 100 may also store a recommendation result to compile a database, and may recommend a similar product for a similar space image in future.

As illustrated in FIG. 17*a*, the electronic device 100 may analyze a space image. For example, the electronic device 100 may analyze that the space image is an image with blue colors, includes a chair image 1710, and includes a wall 1720 and a floor 1730 on which a product image may be synthesized.

As illustrated in FIG. 17*b*, the electronic device 100 may recommend a digital frame 1740 and a region in which the digital frame 1740 is to be arranged, and synthesize a digital frame image. Further, as illustrated in FIG. 17c, the electronic device 100 may also recommend a content to be displayed on a digital frame image 1740-1. Further, once a user command (for example, a command input by tapping a product image) for the digital frame image 1740-1 is input, the electronic device 100 may change a content displayed on the digital frame image 1740-1.

According to another embodiment, the electronic device 100 may further recommend a product related to the recommended product. For example, as illustrated in FIG. 17d, in case that the electronic device 100 recommends the digital frame 1740, the electronic device 100 may further recommend an accessory such as a frame 1740-2 for the digital frame.

Meanwhile, the electronic device 100 may synthesize necessary additional products together at the time of synthesizing a product with the space image. Specifically, as illustrated in FIG. 18, in case that a TV image 1810 is synthesized with a space image, the electronic device 100 may display a position where a One Connect Box 8120, a set-top box 1830, or the like connected to a TV product is to be installed.

Hereinafter, a process of recommending a product by analyzing a space image will be described in more detail.

As described above, the electronic device 100 may obtain color information, product image information, and density information by analyzing a space image. Further, the electronic device 100 may obtain information on a space type, a furniture type, an electronic device type, and the like in the space image by analyzing the space image. Here, the space type may be information on whether a space corresponding to the space image is a living room, a restroom, or a bedroom. The furniture type may be information on a furniture image included in the space image. The electronic device type may be information on various types of electronic devices included in the space image.

The electronic device 100 may recommend a product based on a space analysis result. Here, once a user command to select the recommended product is input, the electronic device 100 may store space analysis data, information on a finally selected product, and the like in the memory 140 to compile a database. However, it is a matter of course that the electronic device 100 may also store the information in an external server.

According to an embodiment of the disclosure, the electronic device 100 may tabulate and store a space ID, space analysis data, a product selected by the user, and a space type.

TABLE 1

| Space ID | Data | Finally Selected Product (Number of Times) | Space Type |
|---|---|---|---|
| Space1 | Place: Living Room Presence or Absence of Device: Digital TV Density in Space: Low Color Distribution: White Furniture Type: Sofa | Sound Bar: 5 Table: 2 Frame: 1 ... | Type A |
| Space2 | Place: Kitchen Presence or Absence of Device: Speaker Device Density in Space: Medium Color Distribution: Brown Furniture Type: Table | TV: 0 Frame: 4 Chair: 6 ... | Type B |
| ... | ... | ... | ... |

In case that a database as Table 1 is complied, the electronic device 100 may recommend a product based on a space analysis result and the database for the space image. Specifically, in case that a space image similar to a space image analysis result exists in the database, the electronic device 100 may recommend a recommended product stored in the database.

For example, the electronic device 100 may recommend a sound bar in case that the analyzed space image is similar to the space type of Type A, and the electronic device 100 may recommend a chair in case that the analyzed space image is similar to the space type of Type B.

Meanwhile, in case that the recommended product is a display device, the electronic device 100 may recommend a content to be provided to the display device. Here, the electronic device 100 may recommend a content, based on a category (product type, space type, or the like) and category-specific detailed criteria.

TABLE 2

| Category | Detailed Criteria | Recommended Contents |
|---|---|---|
| Product Type | Product Specialized for Interior Decoration | Art Image or Video that Matches Space Color |
| | Product Specialized for Watching Media | Video Contents |
| | Product Proportion | Media Specialized for Proportion of Product |
| | Product Size | Large-sized: Video Contents Small- and Medium-sized: Sound Visualizer, Work of Art, and the like |
| Space Type | Living Room | Video Contents |
| | Kitchen and Bedroom | Work or Art, Clock, and the like |

As shown in Table 2, the electronic device 100 may recommend a suitable content based on a type of recommended display device and a type of space in which the display device is to be installed.

Here, a deep-learning-based artificial intelligence technology may be used to recommend a product or contents to the user based on space analysis and database. The deep-learning-based recommendation method described above may be performed in the electronic device 100. However, it is a matter of course that the deep-learning-based recommendation method may be performed in an external server and a result thereof may be received by the electronic device 100.

For example, in case that the deep-learning-based recommendation is performed in an external server, the external server may recommend a product based on a data recognition model created by using a learning algorithm. Here, the external server may include a data learner and a data recognizer.

Here, the data learner may create a data recognition model having criteria for determining a certain situation or may make the data recognition model to learn the criteria for determining a certain situation. In order to determine a certain situation, the data learner may apply learning data to a data recognition model to create a data recognition model having determination criteria.

The data recognizer may determine a situation based on recognition data. The data recognizer may determine a situation based on predetermined recognition data by using the learned data recognition model. The data recognizer may obtain predetermined recognition data according to predetermined criteria, and apply the obtained recognition data, as an input value, to the data recognition model, to thereby determine (or estimate) a certain situation based on the predetermined recognition data.

Further, a result value output by applying an input value for the obtained recognition data to the data recognition model may be used to update the data recognition model.

Meanwhile, the data learner may include a data obtainer, a pre-processor, a learning data selector, a model learner, and a model evaluator, and the data recognizer may include a data obtainer, a pre-processor, a recognition data selector, a recognition result provider, and a model updater.

FIG. 19 is a flowchart for describing a process of synthesizing a product image according to an embodiment of the disclosure.

First, the electronic device 100 may capture a marker object including a handwriting image to obtain a space image (S1910). As described above, it is possible to obtain a size of a product image with respect to an actual size of a product based on a ratio of the size of a marker object image to a size of the marker object.

The electronic device 100 may obtain information on one or more products corresponding to the handwriting image included in the marker object (S1920). The handwriting image may be a drawing drawn by the user, and may include at least one of color information or shape information.

Once one of the obtained one or more products is selected through the inputter 130, the electronic device 100 may synthesize and display a product image in and on a region in which a marker object image is positioned, based on information on the selected product, size information of the marker object, and size information of the marker object image (S1930).

In addition, the control method of an electronic device according to the various embodiments described above may be implemented by a program to thereby be provided to the display device. Particularly, a problem including the display method may be stored and provided in a non-transitory computer readable medium.

The non-transitory computer readable medium is not a medium that stores data therein for a while, such as a register, a cache, or a memory, but means a medium that semi-permanently stores data therein and is readable by a device. In detail, the various applications or programs described above may be stored and provided in the non-transitory computer readable medium such as a compact disk (CD), a digital versatile disk (DVD), a hard disk, a Blu-ray disk, a universal serial bus (USB), a memory card, a read only memory (ROM), or the like.

Although the embodiments of the disclosure have been illustrated and described hereinabove, the disclosure is not limited to the abovementioned specific embodiments, but may be variously modified by those skilled in the art to which the disclosure pertains without departing from the scope and spirit of the disclosure as disclosed in the accompanying claims. These modifications should also be understood to fall within the scope of the disclosure.

What is claimed is:

1. A control method of an electronic device including a camera and a display, the control method comprising:
    obtaining, by a camera, a captured image including a marker object on which a sketch is drawn;
    obtaining information on a plurality of products corresponding to the sketch by analyzing the captured image;
    displaying the information on the plurality of products on the display;
    based on a first user command for selecting a first product among the plurality of products, obtaining a first image including the first product in a region in which the marker object is positioned;
    displaying the first image on the display;
    based on a second user command for selecting a second product among the plurality of products, obtaining a second image including the second product in a region in which the first product is positioned; and
    displaying the second image on the display.

2. The control method as claimed in claim 1, wherein in the obtaining the first image, the first image is processed by analyzing size information of the first product, size information of the marker object, size information of the marker object image, and perspective information of the marker object image.

3. The control method as claimed in claim 1, wherein the captured image includes color information, and
    in the obtaining of the information the plurality of products, information on the plurality of products corresponding to the sketch and color information of the captured image is obtained.

4. The control method as claimed in claim 1, further comprising:
    based on a user command to delete one of a plurality of product images included in the captured image is input, deleting the one product image; and
    performing image synthesis on a region from which the product image is deleted based on an image pattern of a surrounding region of the deleted product image and displaying a synthesized image.

5. The control method as claimed in claim 1, further comprising:
    based on one of a plurality of product images included in the captured image being selected, obtaining product information of the selected product image; and
    recommending new product information based on the obtained product information.

6. The control method as claimed in claim 1, further comprising:
    obtaining color information of the captured image; and
    recommending new product information based on a plurality of product information included in the captured image and the color information.

7. The control method as claimed in claim 1, wherein in the displaying, based on a user command for specifying one of a plurality of product images included in the captured image being input, the one product image specified in the user command is repositioned and displayed based on the user command.

8. The control method as claimed in claim 1, wherein the information on the plurality of products include at least one of size information, category information, or price information of a product.

9. An electronic device comprising:
    a camera configured to capture an image;
    a display configured to display the image;
    an inputter configured to receive a user command;
    at least one processor; and
    a memory configured to store one or more computer programs executed by the at least one processor,
    wherein the one or more computer programs include:
    a command to control the camera to capture a marker object on which a sketch is drawn to obtain a captured image;

a command to obtain information on a plurality of products corresponding to the sketch by analyzing the captured image;
a command to control the display to display the information on the plurality of products;
a command to obtain a first image including a first product in a region in which the marker object is positioned based on a first user command for selecting the first product among the plurality of products;
a command to control the display to display the first image;
a command to obtain a second image including a second product in a region in which the first product is positioned based on a second user command for selecting the second product among the plurality of products; and
control the display to display the second image.

10. The electronic device as claimed in claim 9, wherein the command to obtain the first image includes a command to synthesize and process the first image by analyzing size information of the first product, size information of the marker object, size information of the marker object image, and perspective information of the marker object image.

11. The electronic device as claimed in claim 9, wherein the captured image includes color information, and the command to obtain the information on the plurality of products includes a command to obtain information on the plurality of products corresponding to the sketch and the color information of the captured image.

12. The electronic device as claimed in claim 9, wherein the one or more computer programs further include:
a command to receive a user command to delete one of a plurality of product images included in the captured image, a command to delete the one product image; and
a command to perform image synthesis and processing on a region from which the product image is deleted based on an image pattern of a surrounding region of the deleted product image.

13. The electronic device as claimed in claim 9, wherein the one or more computer programs further include:
a command to obtain, based on one of a plurality of product images included in the captured image is selected, product information of the selected product image; and
a command to recommend new product information based on the obtained product information.

* * * * *